(12) United States Patent
Janik

(10) Patent No.: US 6,864,798 B2
(45) Date of Patent: Mar. 8, 2005

(54) DEVICE DOCKING APPARATUS AND METHOD FOR USING THE SAME

(75) Inventor: Craig M. Janik, Los Altos Hills, CA (US)

(73) Assignee: Simple Devices, San Mateo, CA (US)

( * ) Notice: Subject to any disclaimer, the term of this patent is extended or adjusted under 35 U.S.C. 154(b) by 120 days.

(21) Appl. No.: 09/921,194

(22) Filed: Aug. 1, 2001

(65) Prior Publication Data

US 2002/0050807 A1 May 2, 2002

Related U.S. Application Data

(60) Provisional application No. 60/222,500, filed on Aug. 2, 2000.

(51) Int. Cl.[7] ............................................. G08B 23/00
(52) U.S. Cl. .......................... 340/693.11; 340/310.01; 340/310.06; 340/310.08; 340/636; 340/635; 320/107; 320/114; 320/115
(58) Field of Search ...................... 340/310.01, 310.06, 340/310.08, 636, 635, 693.11; 320/114, 115, 107; 455/572, 573

(56) References Cited

U.S. PATENT DOCUMENTS

| 3,739,226 | A | * | 6/1973 | Seiter et al. ................... 315/86 |
| 5,473,517 | A | * | 12/1995 | Blackman ..................... 362/95 |
| 5,539,821 | A | * | 7/1996 | Blonder ........................ 379/446 |
| 5,625,877 | A | * | 4/1997 | Dunn et al. .................. 455/34.1 |
| 5,708,705 | A | | 1/1998 | Yamashita et al. |
| 5,739,665 | A | | 4/1998 | Bares |
| 5,959,287 | A | * | 9/1999 | Myers et al. ........... 235/472.02 |
| 6,010,228 | A | * | 1/2000 | Blackman et al. ............ 362/95 |
| 6,329,787 | B1 | | 12/2001 | Ito et al. |
| 6,429,625 | B1 | * | 8/2002 | LeFevre et al. .............. 320/155 |
| 6,518,724 | B2 | * | 2/2003 | Janik .......................... 320/115 |

FOREIGN PATENT DOCUMENTS

| EP | 06113032 | 4/1994 |
| EP | 0961466 A1 | 12/1999 |
| JP | 06113032 | 4/1994 |
| JP | 06113470 | 4/1994 |
| JP | 11111412 | 4/1999 |
| WO | PCT/US 01/24210 | 3/2002 |

* cited by examiner

Primary Examiner—Hung Nguyen
(74) Attorney, Agent, or Firm—Gary R. Jarosik

(57) ABSTRACT

A device docking apparatus and method for using the same are described. In one embodiment, the device docking apparatus includes a wall switch plate, a receptacle, a control charging module, and an AC power input. The wall switch plate is fastened to a light switch module on a wall. The receptacle is capable of holding a portable electronic device. The control charging module includes electrical contacts corresponding to electrical contacts on the portable electronic device. The control charging module also includes a printed circuit board and an integrated circuit. The AC power input supplies power to the portable electronic device when the portable electronic device is docked in the device docking apparatus. Power from the AC power input is converted to DC power by the control charging module.

54 Claims, 24 Drawing Sheets

DEVICE DOCKING APPARATUS AND METHOD FOR USING THE SAME

This application claims the benefit of the filing date of the following Provisional U.S. Patent Application: "Integrated PDA and Electrical Wall Plate Docket", application No. 60/222,500, filed Aug. 2, 2000.

CROSS-REFERENCE TO RELATED APPLICATIONS (1) U.S. Pat. No. 6,518,724, issued from application Ser. No. 09/921,197, filed Aug. 1, 2001, entitled "WALL SWITCH DEVICE AND POWER OUTLET DEVICE;" and
(2) U.S. patent application Ser. No. 09/921,195, filed Aug. 1, 2001, entitled "A SYSTEM INCLUDING A WALL SWITCH DEVICE AND A SYSTEM INCLUDING A POWER OUTLET DEVICE AND METHODS FOR USING THE SAME."

FIELD OF THE INVENTION

The present invention relates generally to ubiquitous computing devices and, more particularly, to a device docking apparatus for portable electronic devices.

BACKGROUND

Ubiquitous computing is the method of enhancing computer use by making computers available throughout the physical environment, but making them effectively invisible to the user. This may be done by incorporating unassuming computer devices within the facets of everyday life.

Facets of everyday life may include activities involving portable electronic devices such as personal digital assistants (PDAs) or cellular phones. These types of devices are used frequently in the home or other areas such as an office building. Portable electronic devices such as PDAs and tablet-type PCs are increasingly being made available with wireless communication links that allow the user to access the Internet or other local connected devices. Since all of these devices are portable, they contain batteries that must be re-charged periodically. PDAs and Web-pads typically include a dock or cradle that provides a communication hardware link to a PC and also provides charging. The cradles must be plugged into an AC outlet for the charging function to occur. As these types of portable computing devices proliferate, adding multiple cradles at various locations around a facility would provide more ubiquitous access to charging. However, the need to plug each cradle into an AC power outlet limits the location of the cradles to the location of AC outlets, and increases the amount of exposed AC wiring. For homes in particular, excess exposed AC wires are inconvenient, unsightly, and dangerous.

Therefore, what is needed is a system or method to incorporate these portable electronic devices in locations around the home or other buildings that are convenient and relatively invisible to the user. In addition, what is needed are new devices, conveniently located around a home or other building that serve to provide the same type of uses to a user as a PDA or computer, but are effectively invisible and convenient to the user. Finally, what is needed is a ubiquitously located device for recharging web-pads and PDAs without exposed AC power wires.

SUMMARY OF THE INVENTION

A device docking apparatus and method for using the same are described. In one embodiment, the device docking apparatus includes a wall switch plate, a receptacle, a control charging module, and an AC power input. The wall switch plate is fastened to a light switch module on a wall. The receptacle is capable of holding a portable electronic device. The control charging module includes electrical contacts corresponding to electrical contacts on the portable electronic device. The control charging module also includes a printed circuit board and an integrated circuit. The AC power input supplies power to the portable electronic device when the portable electronic device is docked in the device docking apparatus. Power from the AC power input is converted to DC power by the control charging module.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
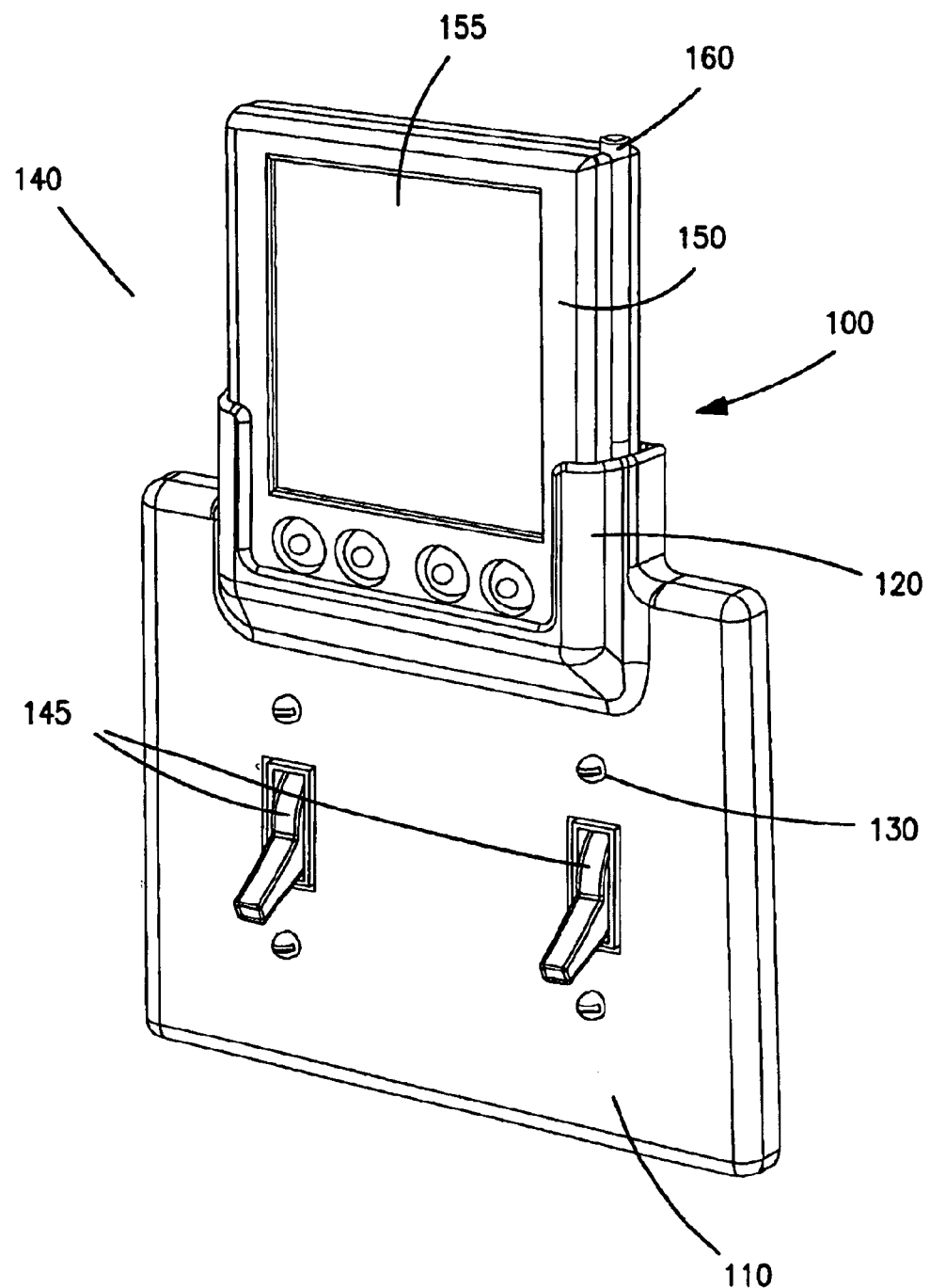
FIG. 1 illustrates an isometric view of one embodiment of a device docking apparatus holding a PDA.

A device docking apparatus and method for using the same are described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

A set of definitions is provided below to clarify the present invention.

Definitions

A PDA is a Personal Digital Assistant, a class of personal computer devices that are typically small enough to be carried conveniently by a person. A PDA typically has a liquid crystal display (LCD) that allows the user to write on it with a stylus, or otherwise control and manipulate the software and stored content on the PDA. When used in the home, and incorporating a connection to the worldwide web, PDAs are often referred to as webpads.

A network is one or more computer devices or electronic devices of any type, such as, for example, but not limited to a personal computer (PC), network appliance, or PDA, connected together by a data transfer link. A PDA that has a communication link to the Internet is often referred to as a node. A node (point of interaction with the Internet) on the network can potentially communicate with (i.e. can send or receive data to) any other node (electronic device) on the network. Network physical layers may be wired or they may be wireless.

The Internet is used interchangeably with the term web or worldwide web. Both of these are defined as the worldwide network of PCs, servers, and other devices.

A network appliance is defined as a standalone computer device that is a single-purpose device, as opposed to a PC, which can run software to perform a wide variety of tasks. A network appliance typically has a minimal user interface that allows the user to perform a more specific set of tasks.

A CCD (charged coupled device) is a semiconductor technology used to build electronic image capturing devices such as cameras. Each CCD chip consists of an array of light sensitive photocells that, in conjunction with a lens and a microprocessor and memory, can be used to capture both still shots and moving pictures.

Overview

The present invention includes a device docking apparatus. In one embodiment, the device docking apparatus is fastened to a light switch module on a wall. In an alternative embodiment, the device docking apparatus is fastened to a power outlet module.

Where the device docking apparatus is fastened to a light switch module on a wall, the device docking apparatus includes a wall switch plate, a receptacle on the wall switch plate, a control charging module, and an AC power input. The receptacle may hold a portable electronic device. In one embodiment, the portable electronic device is a personal digital assistant (PDA). In an alternative embodiment, the portable electronic device may be a display module. In other alternative embodiments, the portable electronic device may be another type of device such as a cellular phone.

Where the device docking apparatus is fastened to a power switch module, the device docking apparatus includes a power outlet plate, a receptacle on the power outlet plate, a control charging module, and an AC power input. The receptacle may hold a portable electronic device. In one embodiment, the portable electronic device is a personal digital assistant (PDA). In an alternative embodiment, the portable electronic device may be a display module. In other alternative embodiments, the portable electronic device may other types of devices.

In one embodiment, the device docking apparatus may send and receive data from a network via a wireless transceiver base using a wireless transfer protocol. In an alternative embodiment, the device docking apparatus may send and receive data from a network via data packets superimposed on power wires coupled to the power input of the device docking apparatus.

In one embodiment, the network includes other device docking apparatuses. In an alternative embodiment, the network includes the Internet.

Device Docking Apparatus

FIG. 1 illustrates an isometric view of one embodiment of a device docking apparatus 100 holding a PDA 150. In alternative embodiments, the device docking apparatus 100 may be holding other types of portable electronic devices. The wall switch plate 110 includes a receptacle 120 that holds a portable electronic device. In FIG. 1, the receptacle 120 is a PDA dock that securely retains the PDA 150 on a wall 140. In one embodiment, the PDA 150 has an LCD 155 and a stylus 160. In other embodiments, the PDA 150 may include other features.

Figure 2:
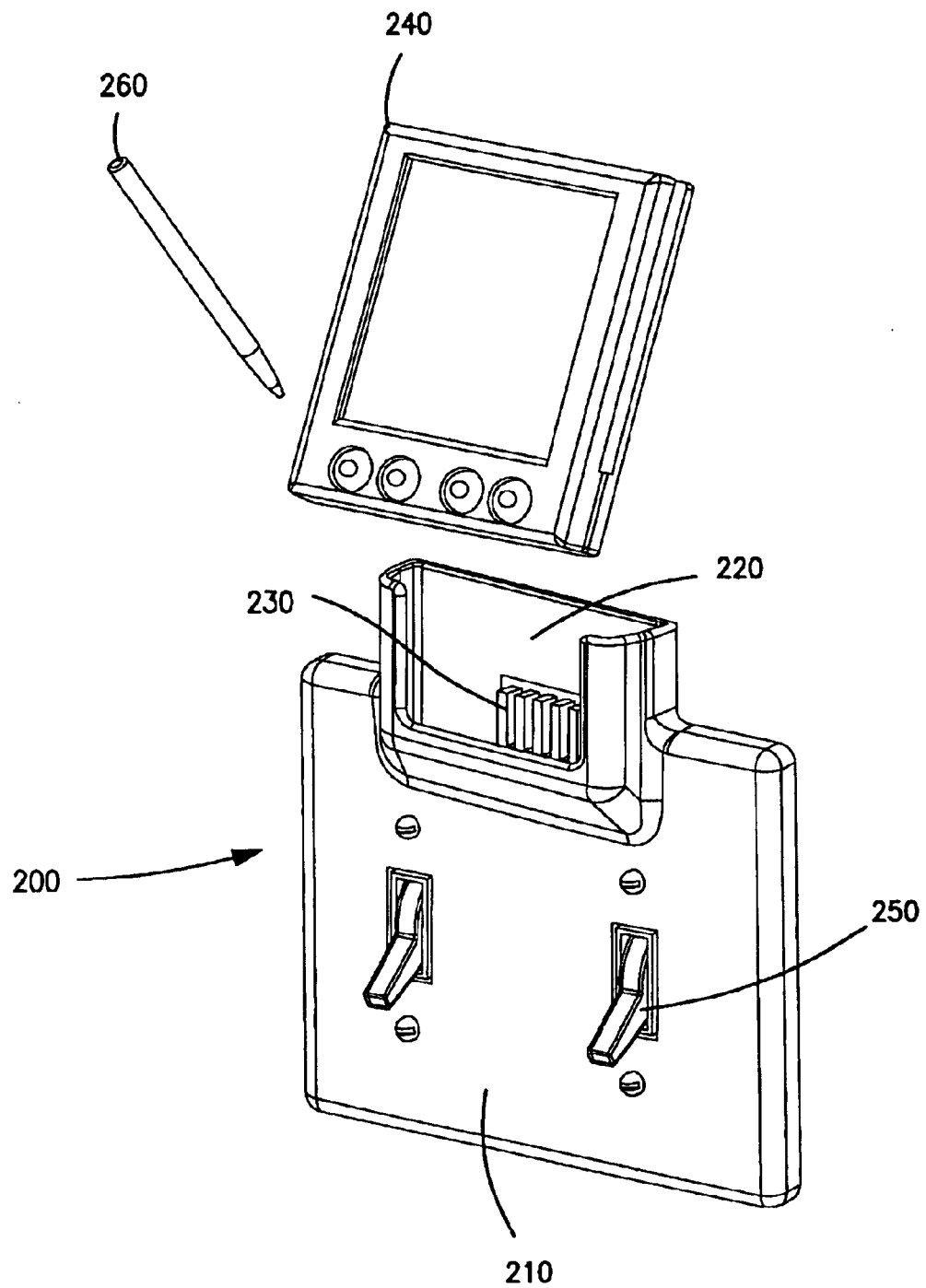
FIG. 2 illustrates one embodiment of a PDA removed from a device docking apparatus.

In one embodiment, the portable electronic device in the device docking apparatus may be removable from the device docking apparatus as seen in FIG. 2. In an alternative embodiment, a component may be integral to the device docking apparatus.

Referring to FIG. 1, the wall switch plate 110 can be retrofitted to any existing light switch electrical junction box. In one embodiment, the wall switch plate 110 may be made so that the device docking apparatus 100 fastens to only one light switch 145. In an alternative embodiment, the wall switch plate 110 may be made to fasten to more than one light switch 145 as shown in FIG. 1.

In one embodiment, the docking device apparatus 100 attaches to a light switch junction box by a conventional screwing system. Wall switch plate crews 130 attach the wall switch plate 110 to the junction box (not shown), which exists in the wall 140.

FIG. 2 illustrates one embodiment of a PDA 240 removed from a device docking apparatus 200. The device docking apparatus 200 is fastened to two light switches 250. The device docking apparatus 200 includes a wall switch plate 210 and a PDA dock 220. The PDA 240 and stylus 260 are removed from the device docking apparatus 200 to show electrical contacts 230 on the device docking apparatus 200 that correspond to electrical contacts 230 (not shown) on the PDA 240.

Figure 3:
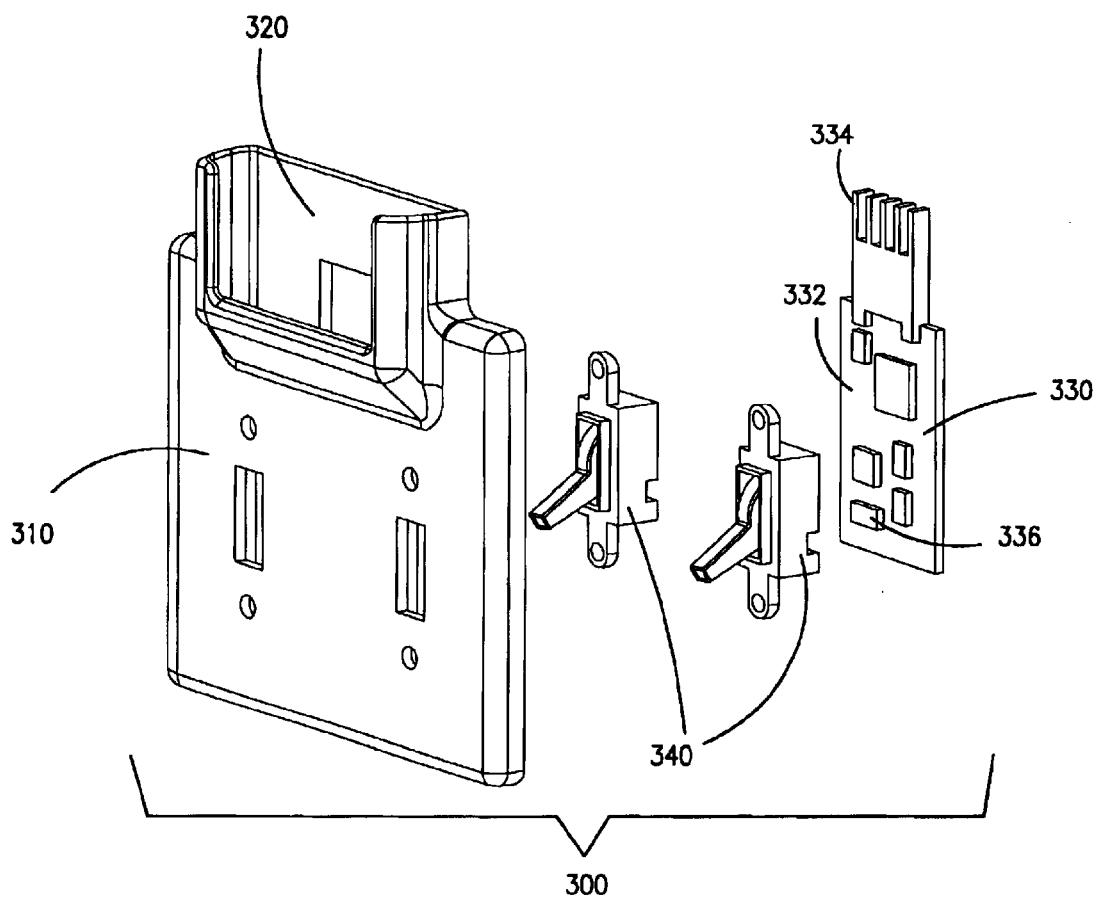
FIG. 3 illustrates an isometric exploded assembly view of one embodiment of a device docking apparatus.

FIG. 3 illustrates an isometric exploded assembly view of one embodiment of a device docking apparatus 300. The device docking apparatus 300 is fastened to light switch modules 340. The device docking apparatus 300 includes a wall switch plate 310, a PDA dock 320, and a control charging module 330. In one embodiment, the control charging module 330 includes a printed circuit board 332, integrated circuits 336, and electrical contacts 334. The control charging module may include other electrical components. Further detail is shown in FIG. 4.

Figure 4:
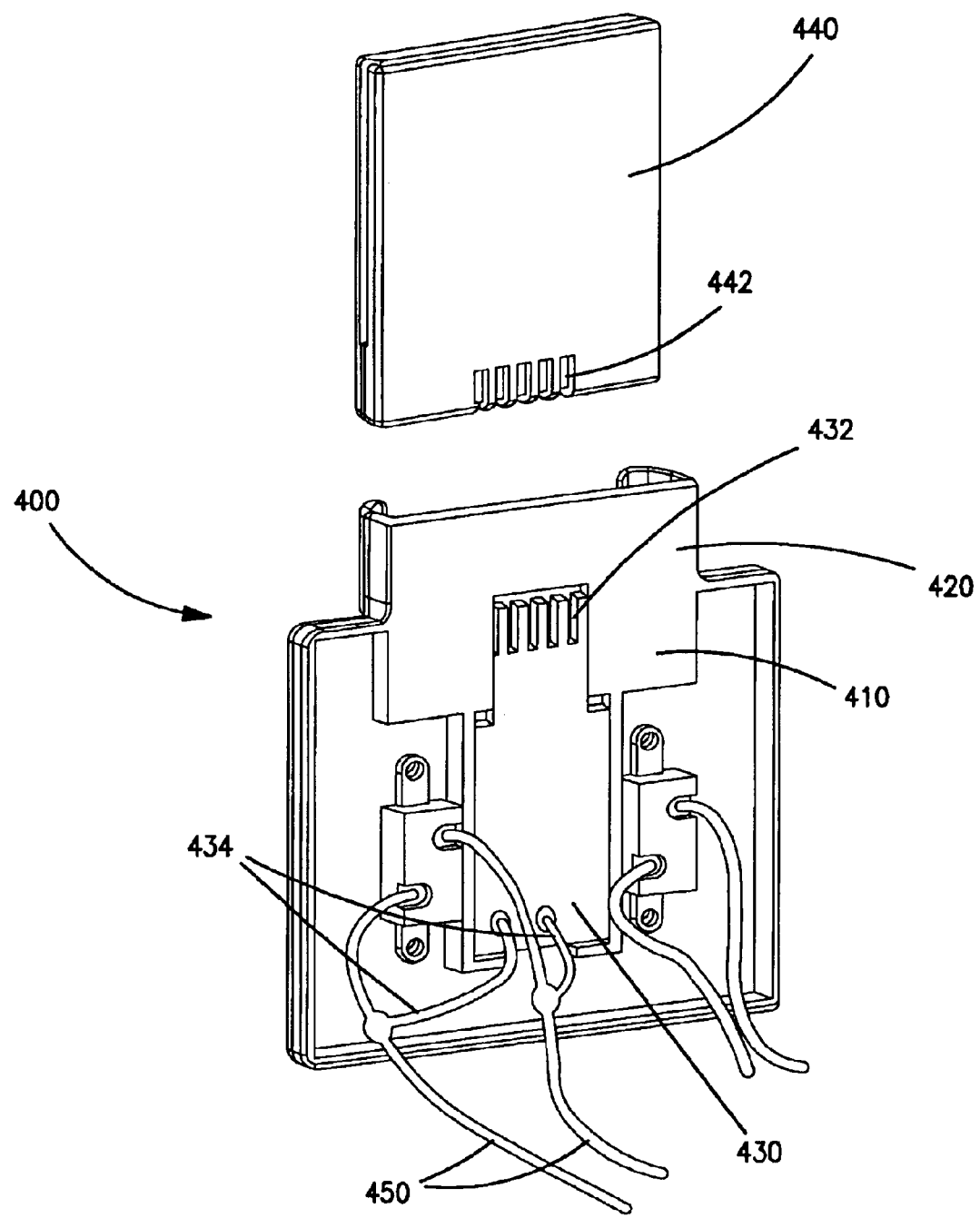
FIG. 4 illustrates a rear view of one embodiment of a device docking apparatus.

FIG. 4 illustrates a rear view of one embodiment of a device docking apparatus 400. The device docking apparatus 400 is fastened to light switch modules. The device docking apparatus 400 includes a wall switch plate 410, a PDA dock 420, and a control charging module 430. The control charging module 430 includes electrical contacts 432 which contact corresponding electrical contacts 442 on the PDA 440 when the PDA 440 is placed all the way into the PDA dock 420. In one embodiment, gravity will suffice to make the electrical contacts 432 and 442 functionally connect.

FIG. 4 also shows that the control charging module 430 includes an AC power input 434 from an AC power wire 450 that extends from the junction box and is connected to the light switch modules 410. Thus, the control charging module 430 is supplied with power from the AC power wire 450. In one embodiment, the control charging module 430 modifies the power from AC to DC that is acceptable (battery charging power levels) for the PDAs 440 located in device docking apparatus 400. In alternative embodiment, other additional components may extend into the wall cavity behind the switch plate 410 as is depicted in the embodiment shown in FIG. 5.

Figure 5:
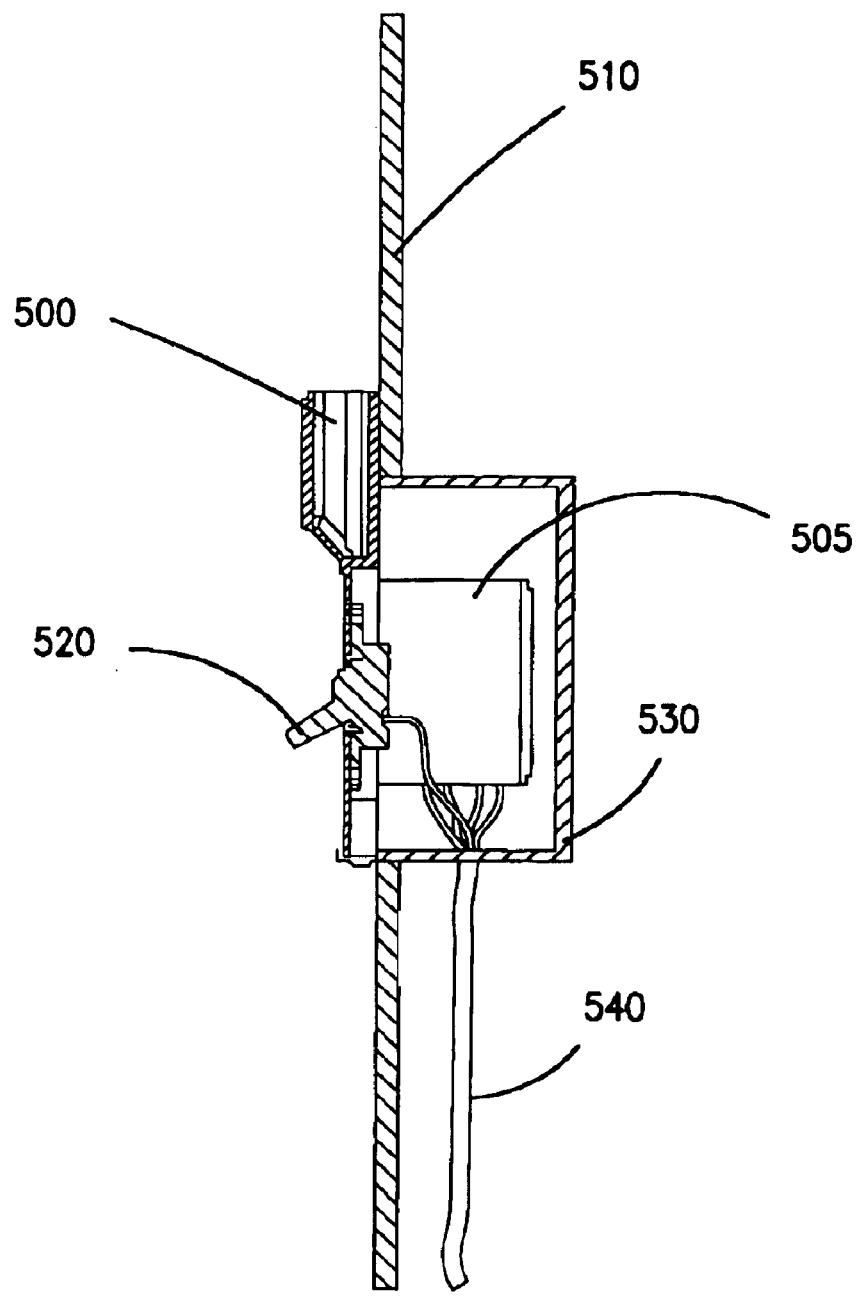
FIG. 5 illustrates a side view of one embodiment of device docking apparatus extending into a junction box.

FIG. 5 illustrates a side view of one embodiment of device docking apparatus 500 extending into a junction box 530. The device docking apparatus 500 is fastened to a light switch module 520 on a wall 510. AC power wires 540 are fed into a junction box 530 in the wall cavity and power the device docking apparatus 500. AC junction boxes 530 may be wired in one of two configurations, with both power and neutral wires entering and accessible at the junction box 530 with a switch in between the power and neutral wires. In FIG. 5, a switch is between the power and neutral wires.

Figure 6:
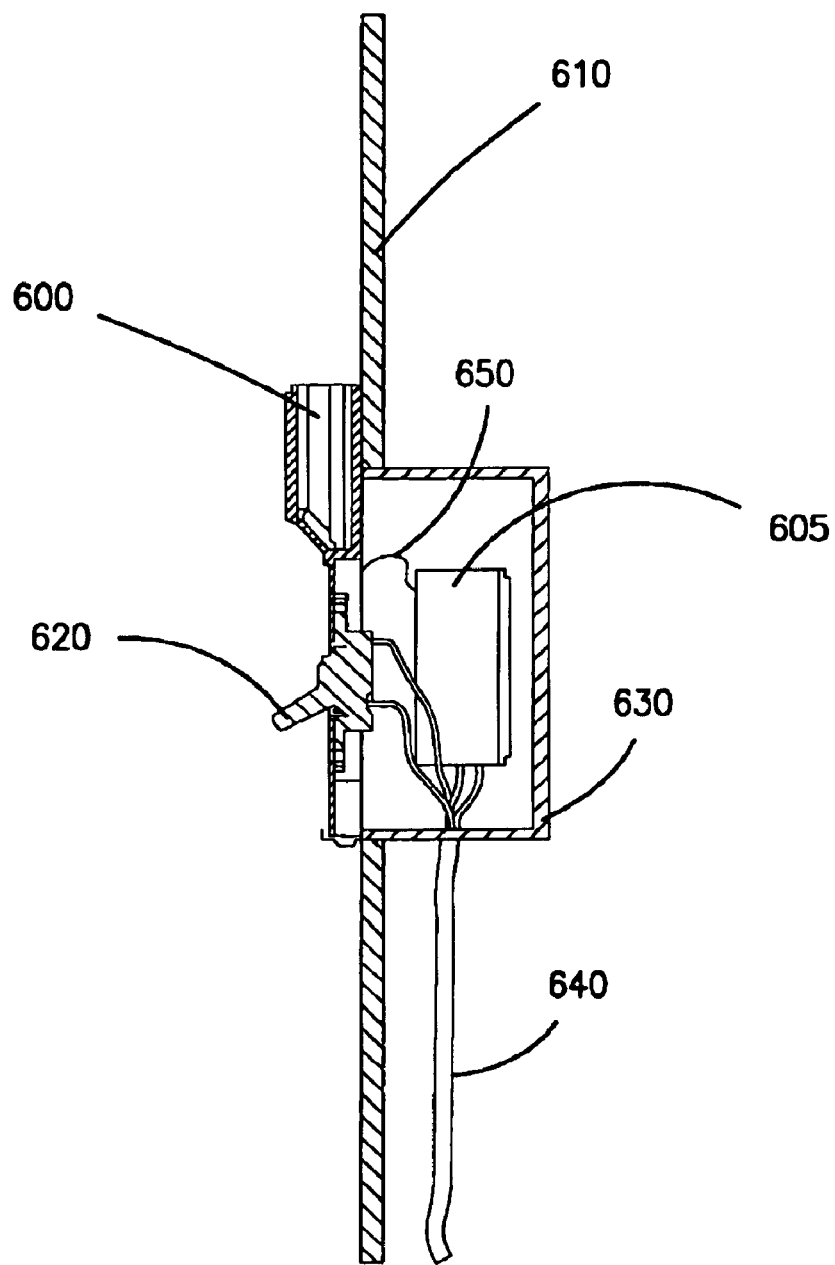
FIG. 6 illustrates a side view of an alternative embodiment of a device docking apparatus extending into a junction box.

FIG. 6 illustrates a side view of an alternative embodiment of a device docking apparatus 600 extending into a junction box 630. The device docking apparatus 600 is fastened to a light switch module 620 on a wall 610. AC power wires 640 are fed into the junction box 630 in the wall cavity and power the device docking apparatus 600. In FIG. 6, a control charging module 605 may be located physically toward the rear of the junction box 630, and functionally connected to a wall switch plate by a ribbon cable 650. This type of arrangement may be used in instances where there is not enough space for the control charging module 605 to exist between the light switch modules 620.

Figure 7:
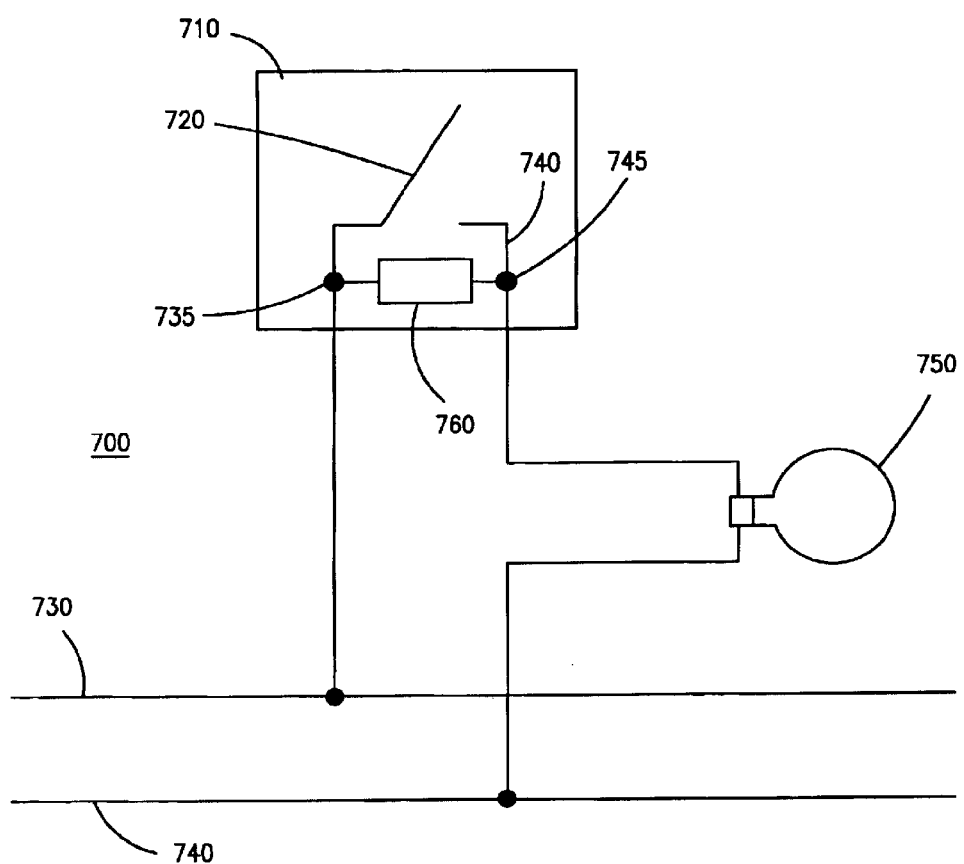
FIG. 7 illustrates a circuit diagram of the embodiment of the device docking apparatus shown in FIG. 5.

FIG. 7 illustrates a circuit diagram of the embodiment of the device docking apparatus 700 shown in FIG. 5. Power taps 735 from 120 volts (V) power 730 and neutral taps 745 from neutral 740 are connected to the control charging module 760 and light bulb 750 in the light junction box 710.

The charging system includes a power conversion function using an AC rectifier circuit and a linear power supply device. AC power conversion such as this is known in the field of electronic product design.

Figure 8:
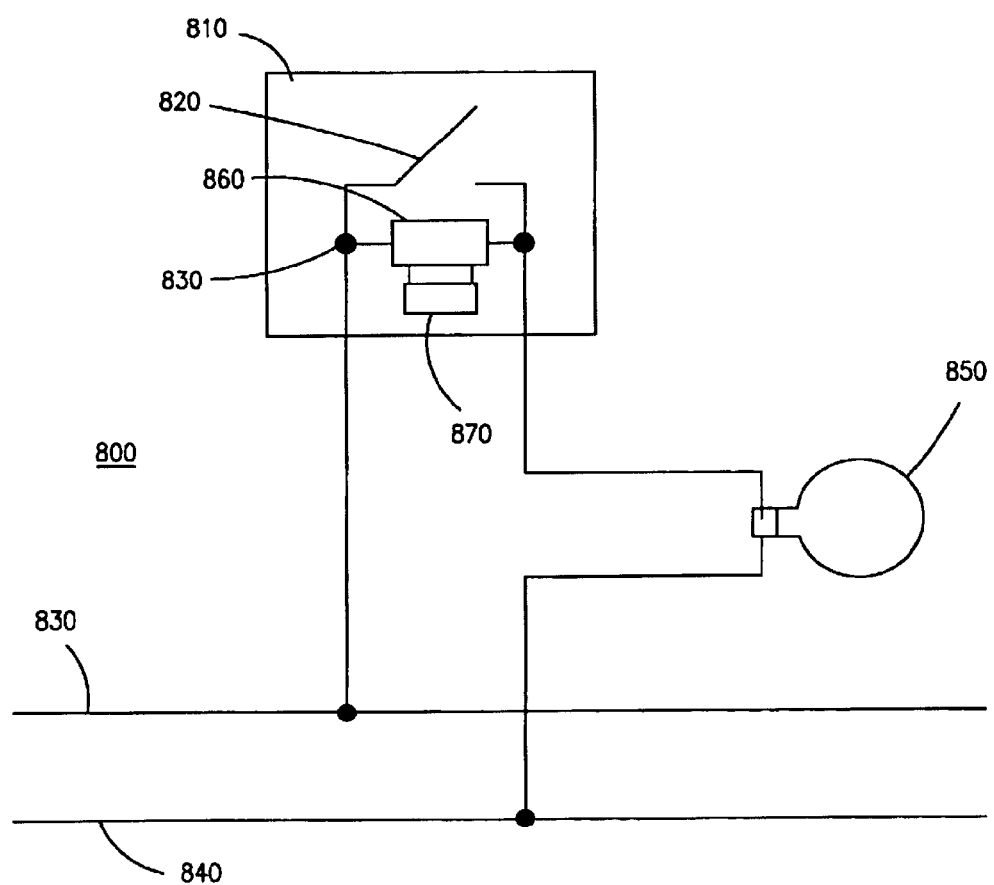
FIG. 8 shows a circuit diagram of an alternative embodiment of a device docking apparatus.

FIG. 8 shows a circuit diagram of an alternative embodiment of a device docking apparatus 800. In FIG. 8, only the power 830 side of the circuit enters and is accessible at the junction box 810 to power a light bulb 850. Accordingly, a different method is required to charge or otherwise power an electronic device.

To power the device docking apparatus 800, a system is used whereby a small amount of current is allowed to flow through low-power conversion circuit, and power is derived from this current flow. Thus a small amount of current is allowed to flow through the light circuit. However, the current is so small that the light filament is emitting little or no visible light. Because the current must be kept small enough to keep the light bulb 850 filament from emitting light when the switch 820 is off, this system also includes a battery 870 that is constantly trickle charged.

Figure 9:
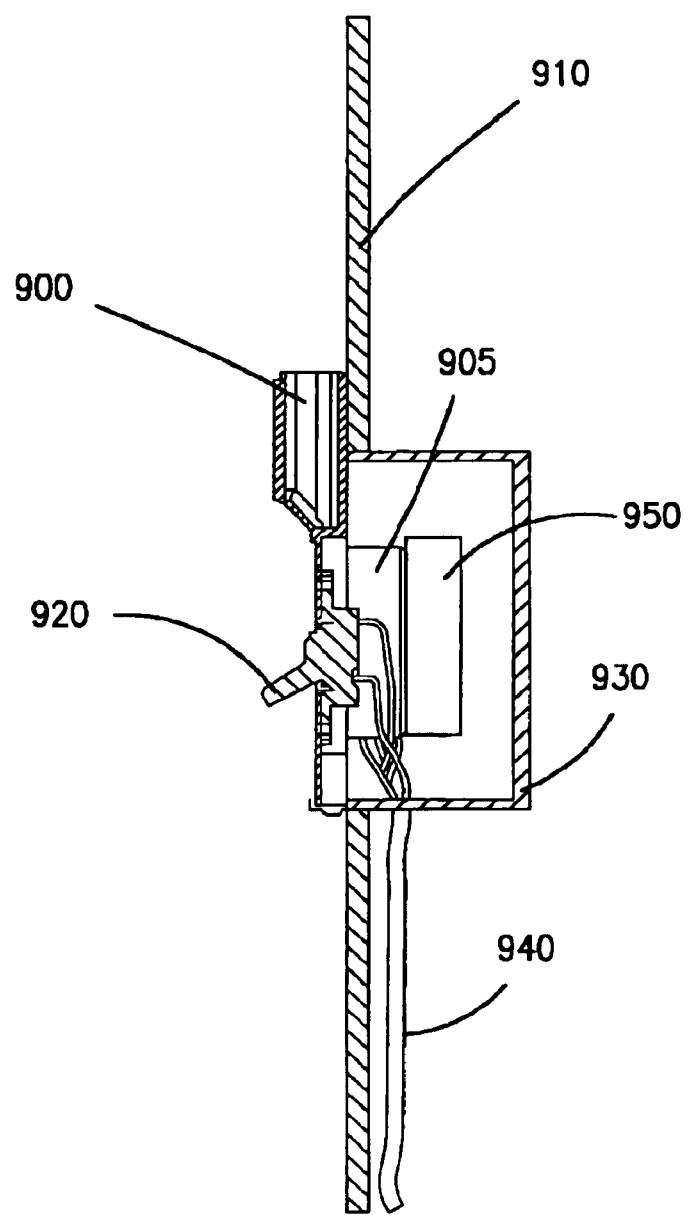
FIG. 9 illustrates a side view of one embodiment of the embodiment of the device docking apparatus of FIG. 8 including a battery.

FIG. 9 illustrates a side view of one embodiment of the embodiment of the device docking apparatus 900 of FIG. 8 including a battery 950. As seen in FIG. 9, the battery 950 is installed in the junction box 930 and provides substantial power for electronic devices docked in a device docking apparatus 900 at the wall 910. The device docking apparatus 900 is fastened to a light switch module 920 on the wall 910. AC power wires 940 are fed into a junction box 930 in the wall cavity and power the device docking apparatus 900 via the control charging module 905.

Figure 10:
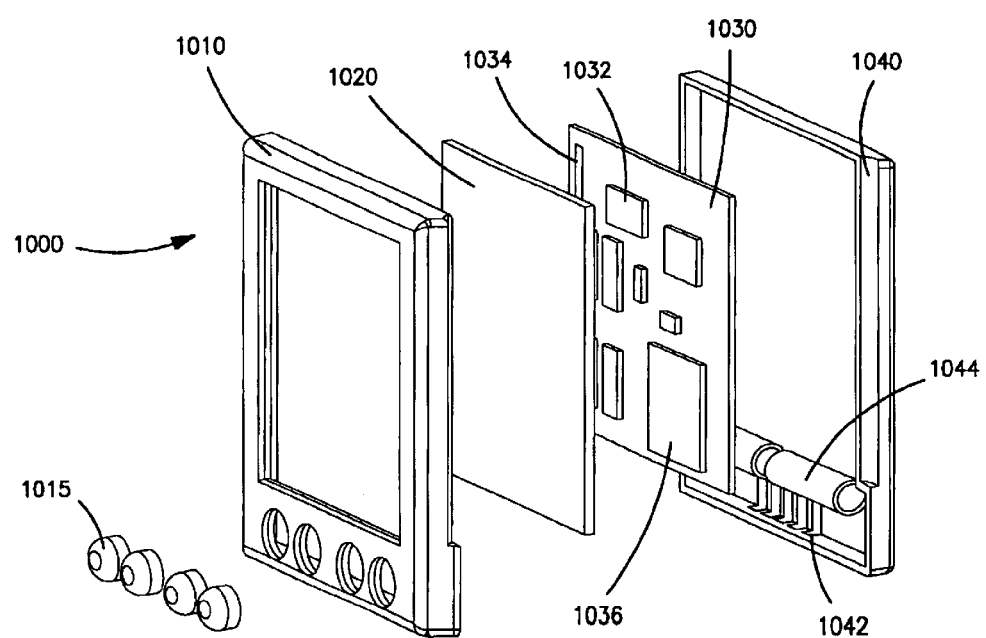
FIG. 10 illustrates an isometric exploded assembly view of one embodiment of a PDA.

FIG. 10 illustrates an isometric exploded assembly view of one embodiment of a PDA 1000. The PDA 1000 shown here is similar to PDAs that currently exist on the market as standalone PDA devices. The size of the PDA 1000 is that which can be conveniently and easily hand held. The construction is of a typical two-piece plastic shell construction including a PDA front housing 1010 and a PDA rear housing 1040. The PDA 1000 includes an LCD 1020 that contains an integral backlight so that the display may be read in low light. In one embodiment, the PDA may also include control buttons 1015 to operate the PDA 1000. There may also be a printed circuit board 1030 that contains the electronic components, including the microprocessor, that constitute the functional data-manipulating aspect of the PDA 1000. Memory chips are included on the printed circuit board 1030. In one embodiment, the PDA 1000 also includes a wireless transceiver integrated circuit 1032 and an antenna 1034. The PDA 1000 also includes electrical contacts 1042 and/or batteries 1044 to power the PDA 1000.

FIG. 10 shows that the antenna is located internal to the PDA 1000, mounted to the printed circuit board. In one embodiment, the wireless system that may be used in the PDA 1000 is an IEEE 802.11b system, manufactured by Intersil, Incorporated. In alternative embodiments, other wireless communication protocols such as Bluetooth™ may be used.

Batteries 1044 are also shown in FIG. 10 so that the PDA 1000 may operate when removed from a device docking apparatus. The entire assembly may be held together with threaded fasteners or any type of commonly used fastening system, including plastic snap-fits.

Figure 11:
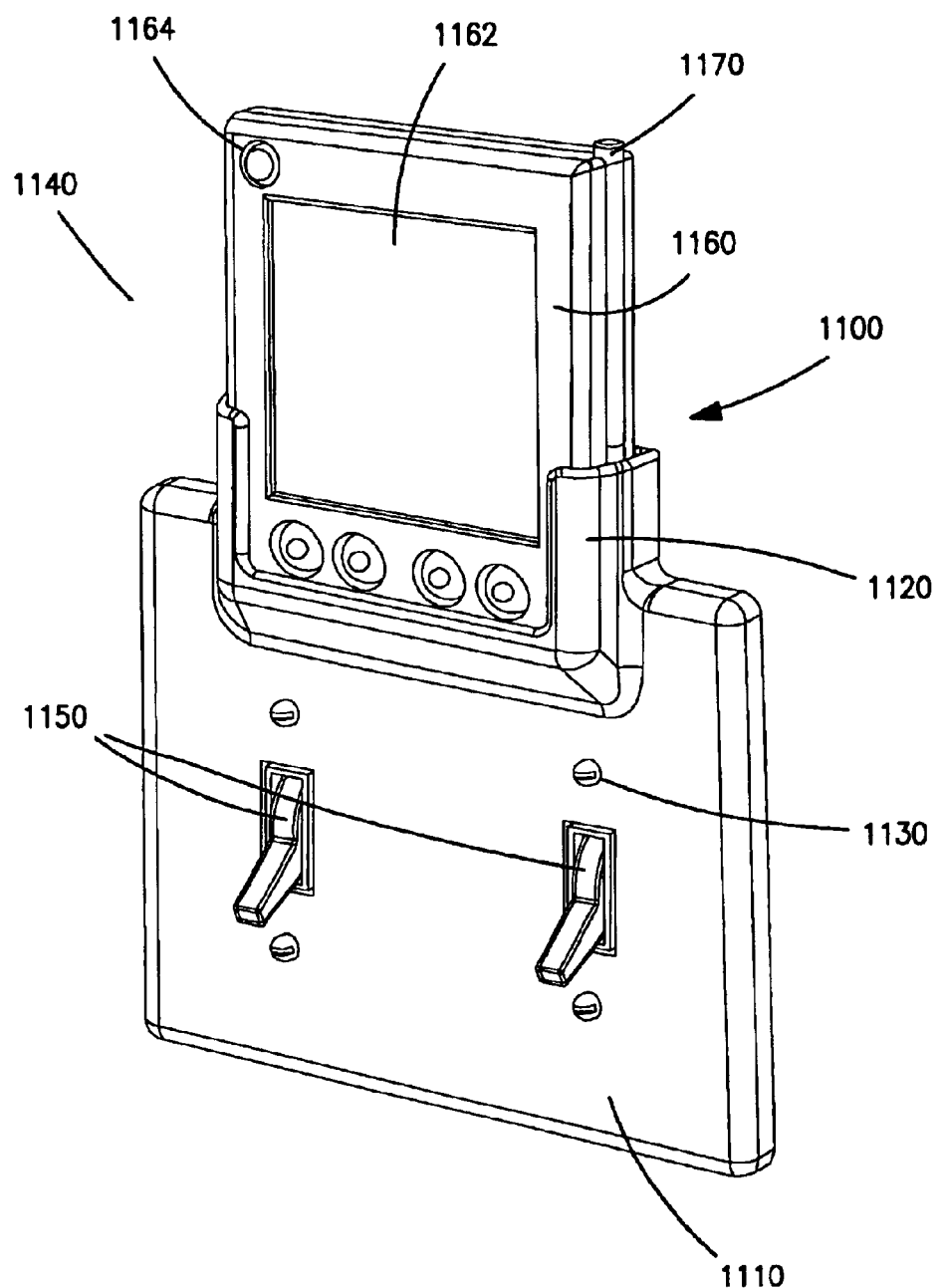
FIG. 11 illustrates an isometric view of one embodiment of a device docking apparatus including a PDA with an integral charge-coupled device (CCD)

FIG. 11 illustrates an isometric view of one embodiment of a device docking apparatus 1100 including a PDA 1060 with an integral charge-coupled device (CCD) 1164. The device docking apparatus 1100 is fastened using switch plate screws 1130 to a light switch 1150 on a wall 1140. The device docking apparatus 1100 includes a wall switch plate 1110 and a receptacle 1120 in the form of a PDA dock. A PDA 1160 is shown with an LCD 1162, a stylus 1170, and a CCD 1164 with a lens. A CCD 1164 is a semiconductor that is used to make a digital camera that is capable of taking still shots or moving pictures. In one embodiment, there is circuitry and other integrated circuits in the PDA 1100 on the printed circuit board that combine to form a subsystem for capturing and transmitting digital images via a wireless communication link between the PDA 1100 and a home server or the Internet. In one embodiment, the PDAs 1100 also include optional CCD camera plug-on adapters. One example of a PDA is the Palm Pilot, manufactured by Palm Computing. Another example of a PDA is Visor, manufactured by Handspring. Both the Palm Pilot and Visor offer such optional CCD camera plug-on adapters.

Figure 12:
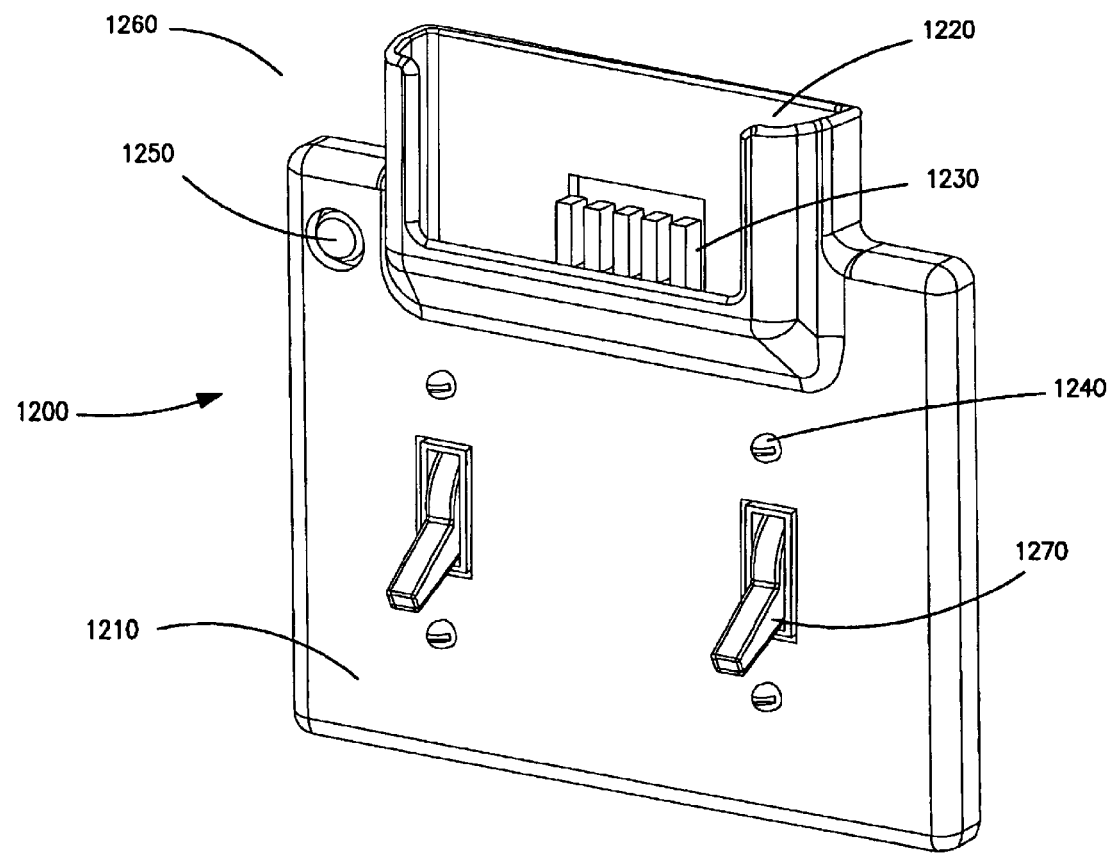
FIG. 12 illustrates an isometric view of one embodiment of a device docking apparatus with an integral CCD.

FIG. 12 illustrates an isometric view of one embodiment of a device docking apparatus 1200 with an integral CCD 1250. The device docking apparatus 1200 is similar to those shown in the previous figures and is fastened using wall switch plate screws 1240 to light switch modules 1270 on a wall 1260. The device docking apparatus 1200 includes a wall switch plate 1210 and a receptacle in the form of a PDA dock 1220. Electrical contacts 1230 may also be seen to contact corresponding electrical contacts on a portable electronic device. All the necessary circuitry for capturing and transmitting digital images is included on the control charging module (not shown). In one example, a remote user may able to access the output of the camera function at a device docking apparatus 1200 in their home regardless of whether or not the PDA is docked with the wall switch plate 1210.

Figure 13:
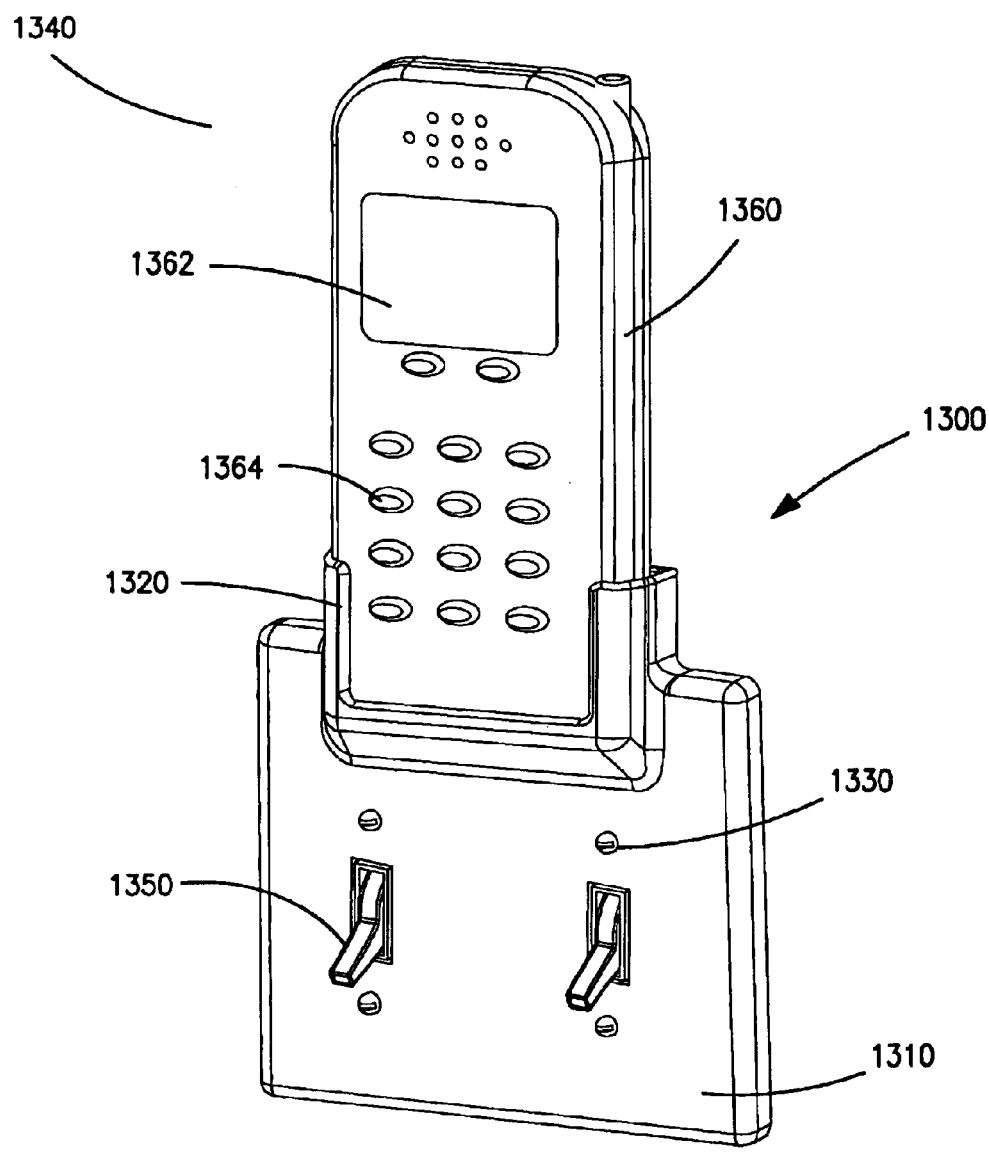
FIG. 13 illustrates an isometric view of one embodiment of a device docking apparatus holding a cellular phone.

FIG. 13 illustrates an isometric view of one embodiment of a device docking apparatus 1300 holding a cellular phone 1360. The device docking apparatus 1300 is fastened using wall switch plate screws 1330 to light switch modules 1350 on a wall 1340. The device docking apparatus 1300 includes a wall switch plate 1310 and a receptacle 1320 that holds the cellular phone 1360. The cellular phone 1360 includes an LCD 1362 and buttons 1364. Docking the cellular phone 1360 in the device docking apparatus 1300 allows the cellular phone 1360 to be conveniently stored and charged using the power supplied to the light switches 1350.

Figure 14:
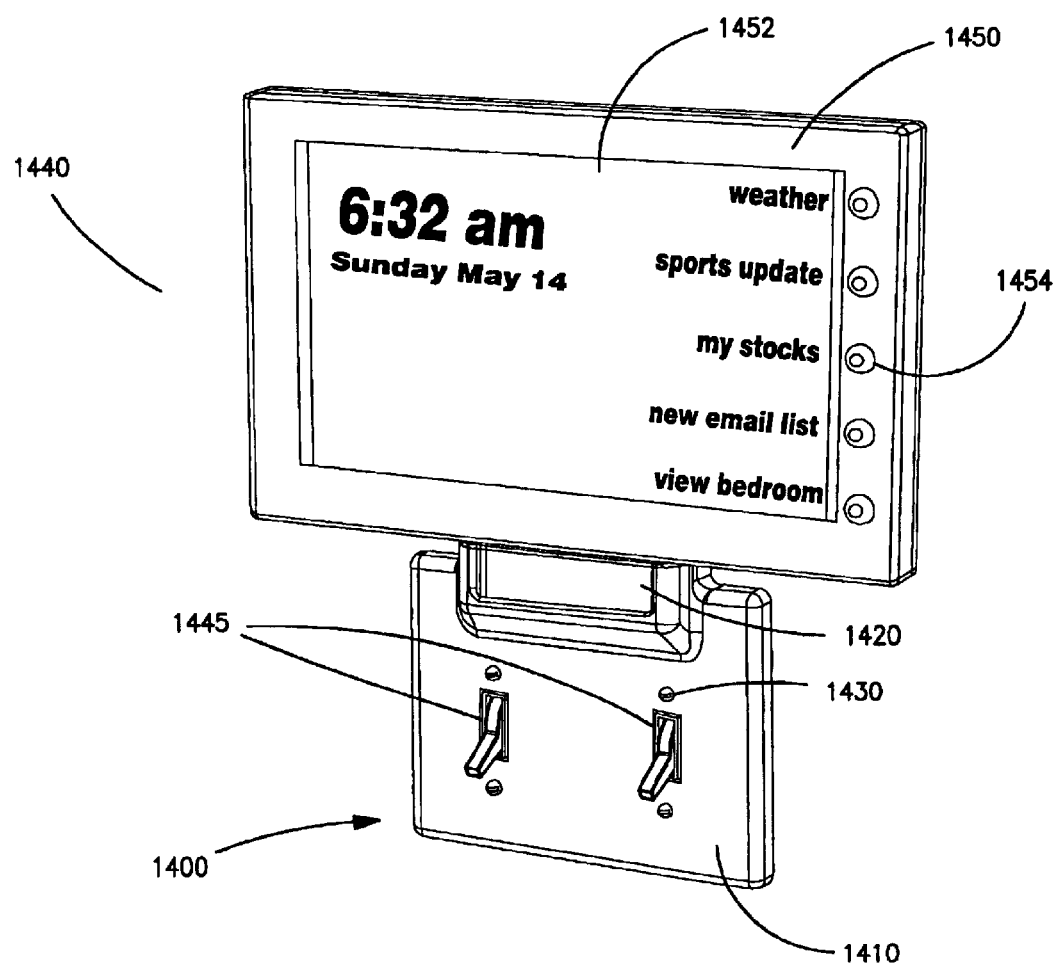
FIG. 14 illustrates an isometric view of one embodiment of a device docking apparatus holding a display module.
Figure 15:
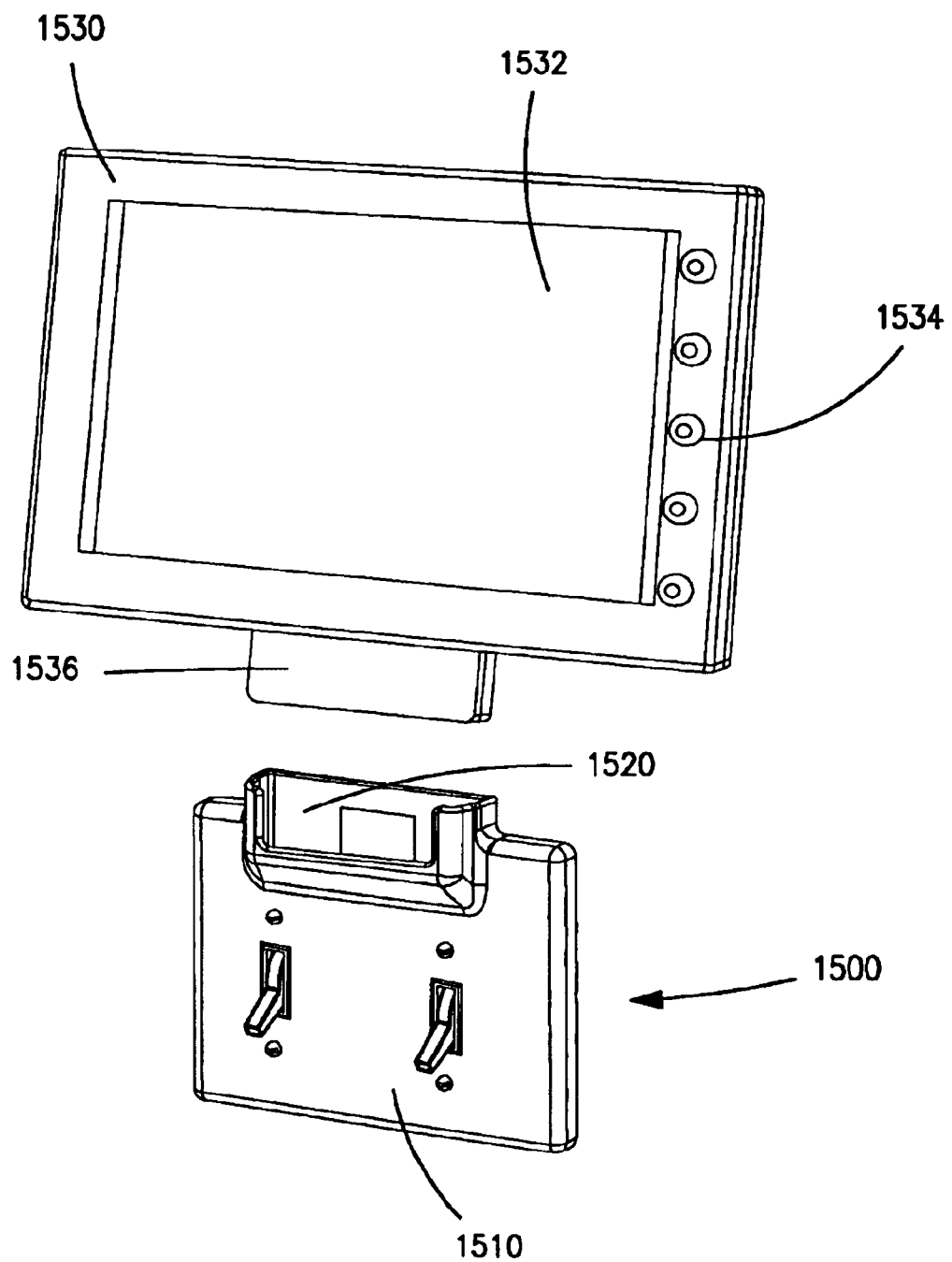
FIG. 15 shows an isometric view of one embodiment of a display module removed from a device docking apparatus.

FIG. 14 illustrates an isometric view of one embodiment of a device docking apparatus 1400 holding a display module 1450. The display module 1450 is similar to a PDA but with a larger LCD 1452. In one embodiment, the display module 1450 may be removable from the device docking apparatus 1400 as seen in FIG. 15. In an alternative embodiment, the display module 1450 may be a component that is integral to the device docking apparatus 1400.

Referring to FIG. 14, the display module 1450 is docked in the device docking apparatus 1400, which is fastened using wall switch plate screws 1430 over light switches 1445 on a wall 1440. The device docking apparatus 1400 includes a wall switch plate 1410 and receptacle 1420 that holds the display module 1450. The display module 1450 includes buttons 1454 that are placed vertically along the right side of the LCD 1452. In this configuration, with the buttons 1454 close to the LCD 1452, each button 1454 can be labeled with text on the LCD 1452 near a corresponding button. In one embodiment, the display module 1450 may also have a stylus that can be stored in the display module 1450 housing.

FIG. 14 shows how, in one embodiment, each button 1454 might be labeled with a relevant item of content. For example, when a button 1454 corresponding to a softkey label is pressed, information of the type designated by the softkey label is presented to a user on the LCD 1452.

FIG. 15 shows an isometric view of a display module 1530 removed from a device docking apparatus 1500. FIG. 15 is similar to the embodiment shown in FIG. 14. The device docking apparatus 1500 includes a wall switch plate 1510 and a receptacle in the form of a display module dock 1520. The display module 1530 has a contact plate 1536 that fits into the display module dock 1520 so that the display module 1530 is docked in the device docking apparatus 1500.

Figure 16:
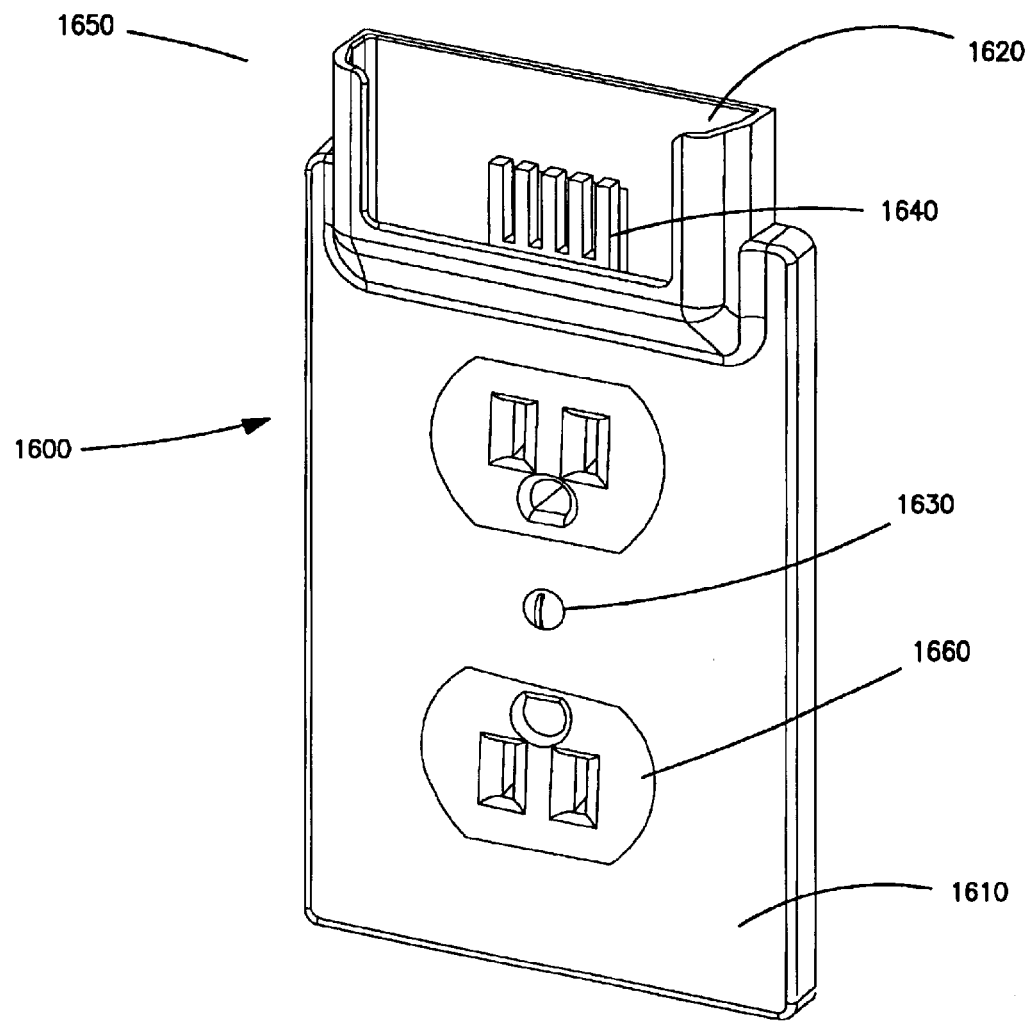
FIG. 16 illustrates an isometric view of an alternative embodiment of a device docking apparatus fastened to a power outlet module.

FIG. 16 illustrates an isometric view of an alternative embodiment of a device docking apparatus 1600 fastened to a power outlet module 1660. The device docking apparatus is fastened to the power outlet module 1660 on a wall 1650 using power outlet plate screws 1630. The device docking apparatus 1600 in FIG. 16 functions in the same manner as the device docking apparatus 100 shown in FIG. 1 by facilitating the charging, storage and operation of a docked portable electronic device. A device docking apparatus 1600 of this type may be used in places where power outlets are conveniently located, such as above a dresser or kitchen counter. The device docking apparatus 1600 includes a power outlet plate 1610, a receptacle in the form of a PDA dock 1620, and electrical contacts 1640 that would correspond to electrical contacts on a PDA.

In one embodiment, the portable electronic device may be removable from the device docking apparatus 1600. In an alternative embodiment, the portable electronic device may be a component that is integral to the device docking apparatus 1600.

Figure 17:
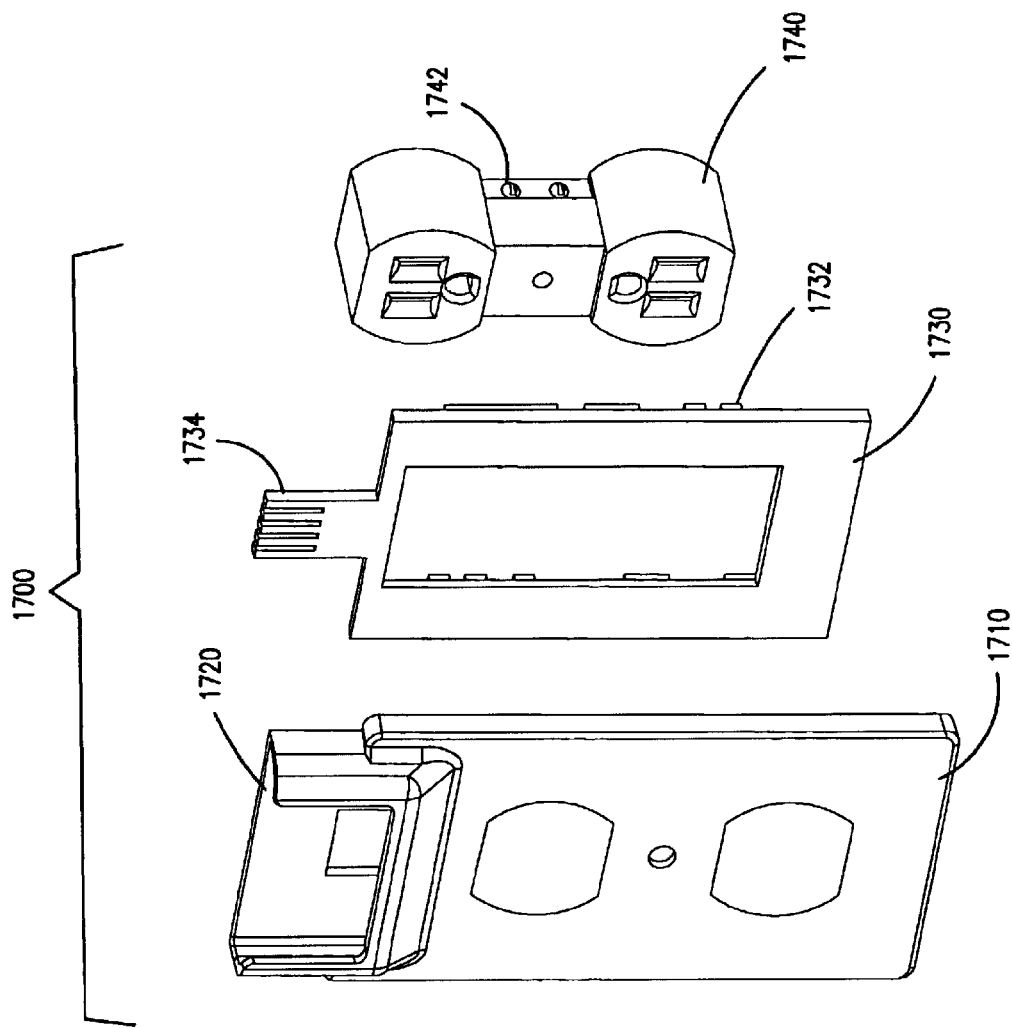
FIG. 17 illustrates an exploded view of an alternative embodiment of a device docking apparatus fastened over a power outlet module.

FIG. 17 illustrates an exploded view of one embodiment of a device docking apparatus 1700 fastened to a power outlet module 1740 including electrical contact screws 1742. The device docking apparatus 1700 includes a power outlet plate 1710, a PDA dock 1720, and a control charging module 1730. The control charging module 1730 includes a printed circuit board with integrated circuits and other electronic components, 1732 and electrical contacts 1734. The control charging module 1730 is similar to the one used in the embodiment shown in FIG. 3, except that the printed circuit board is designed to accommodate the different geometry of the power outlet module 1740 rather than a light switch module.

Wall Switch Device

Figure 18:
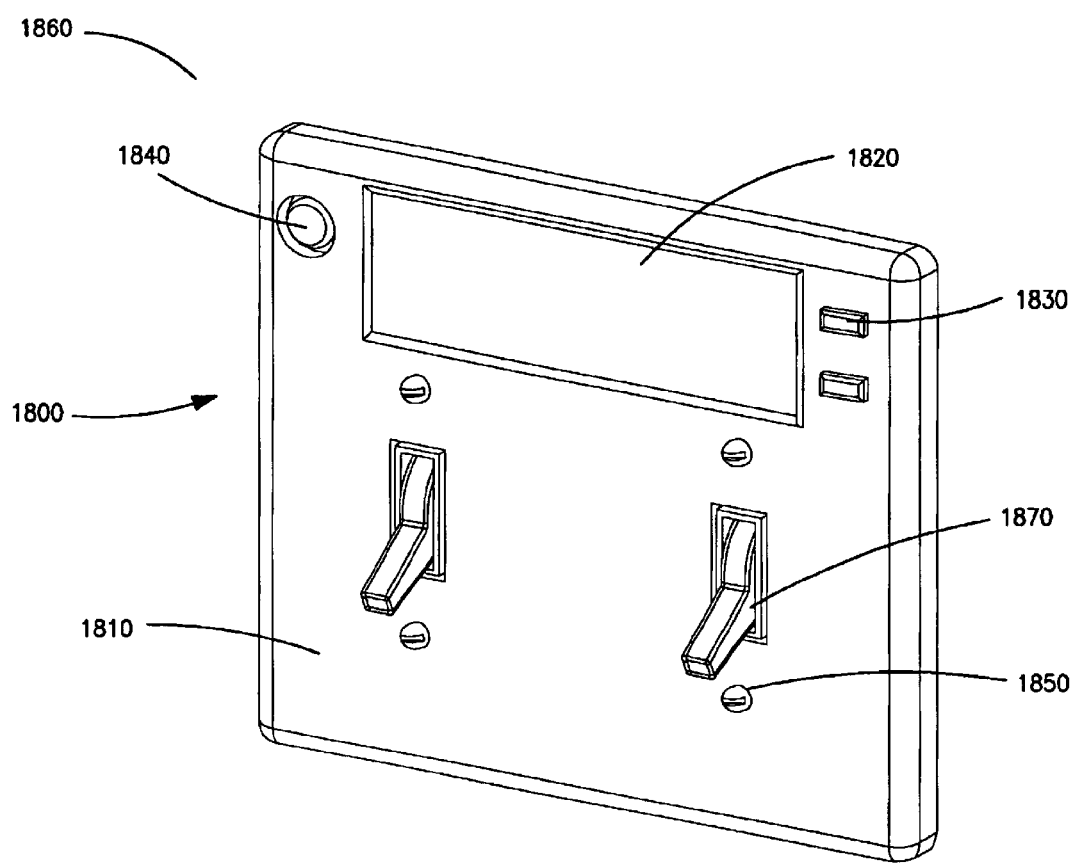
FIG. 18 illustrates an isometric view of one embodiment of a wall switch device with an integral LCD, softkeys, and CCD with lens.

FIG. 18 illustrates an isometric view of one embodiment of a wall switch device 1800 with an integral LCD 1820, softkeys 1830, and CCD with lens 1840. The wall switch device 1800 includes a wall switch plate 1810 that is fastened to light switches 1870 on a wall 1860 with wall switch plate screws 1850. In FIG. 18, the wall switch device 1800 does not act as a charging dock for other portable electronic devices. Rather, the wall switch device 1800 is used as a point of contact with a network of other wall switch devices 1800 or a network such as the Internet. Information is displayed on the LCD 1820 and manipulated with softkeys 1830 located near the LCD 1820. All the necessary circuitry for manipulation and control of the LCD 1820, softkeys 1830, and CCD 1840 are included on the control charging module (not shown).

Figure 19:
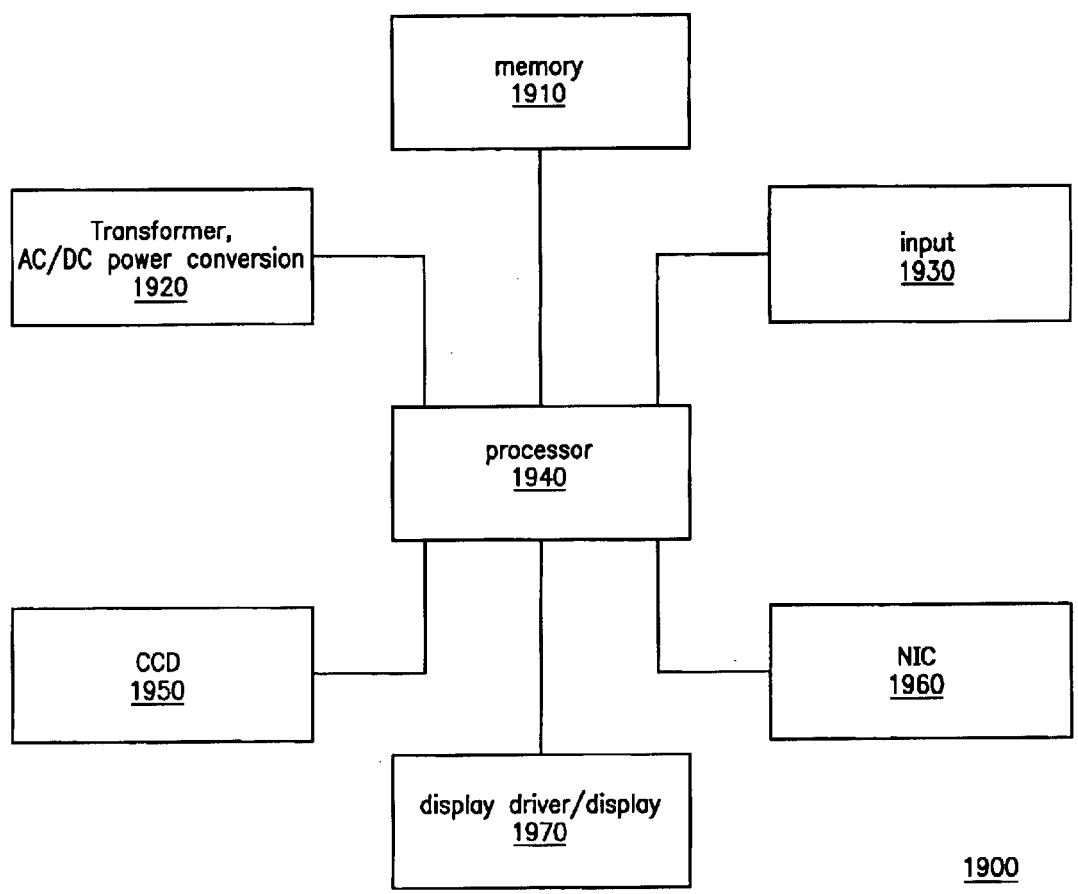
FIG. 19 illustrates a block schematic diagram of one embodiment of a functional system for the wall switch device shown in FIG. 18.

FIG. 19 illustrates a block schematic diagram of one embodiment of a functional system 1900 for the wall switch device 1800 shown in FIG. 18. In one embodiment, a control charging module (not shown) in the wall switch device 1900 may include any of the following integrated hardware:

transformer and AC/DC power conversion 1920, processor 1940, memory 1910, input devices (softkeys) 1930, display driver/display 1970, CCD 1950, and network interface card (NIC) 1960.

While FIGS. 18 and 19 show an example that includes both the LCD and CCD, an alternate embodiment may include a wall switch device with only an LCD, or only a CCD with lens.

Power Outlet Device

Figure 20:
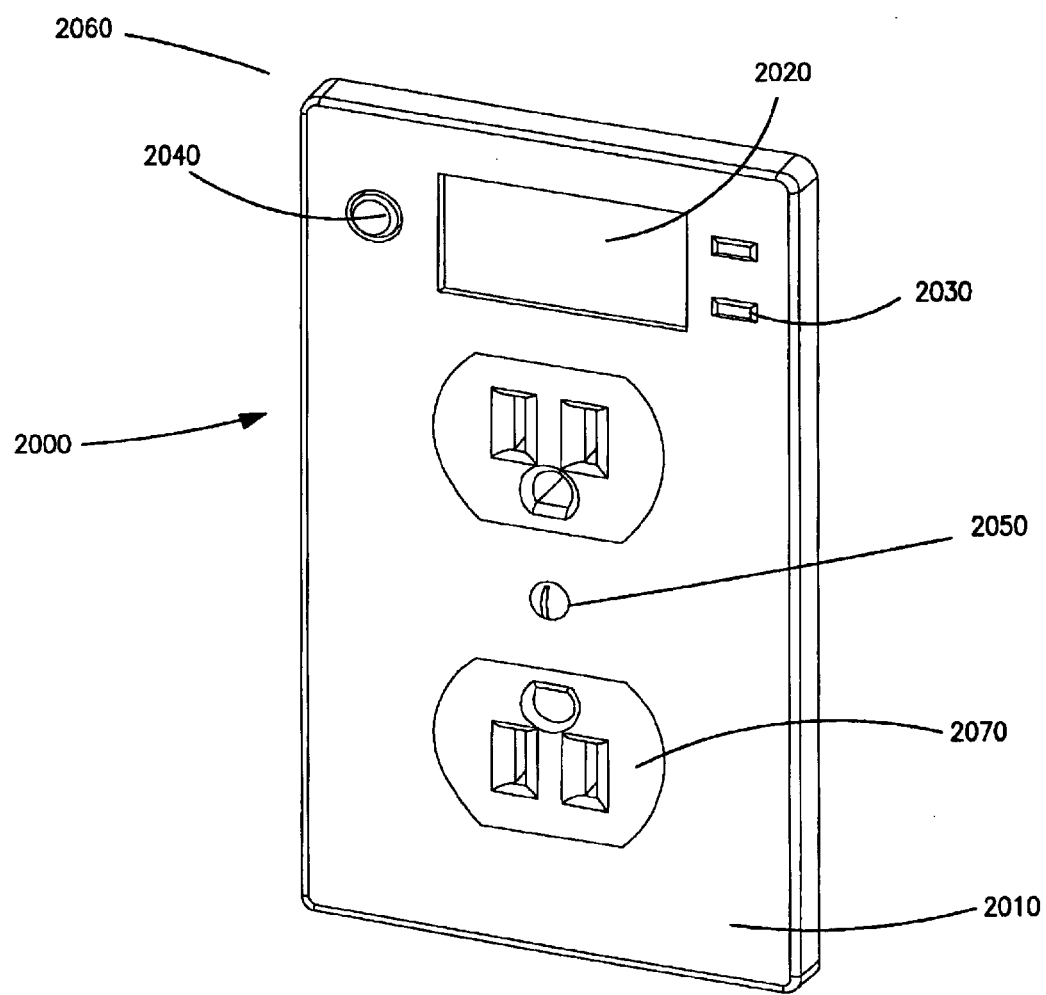
FIG. 20 illustrates an isometric view of one embodiment of a power outlet device with an integral LCD, softkeys, and CCD with lens.

FIG. 20 illustrates an isometric view of one embodiment of a power outlet device 2000 with an integral LCD 2020, softkeys 2030, and CCD with lens 2040. The power outlet device 2000 is similar to the wall switch device 1800 shown in FIG. 18 except the power outlet device 2000 includes a power outlet plate 2010 that is fastened to a power outlet module 2070 on a wall 2060 using power outlet plate screws 2050. Accordingly, the power outlet device 2000 may be used both as a power outlet and as a point of contact with a network of other power outlet devices, or other types of devices, and/or with a network such as the Internet.

Although FIG. 20 shows an embodiment that includes both the LCD and CCD incorporated in a power outlet device, an alternate embodiment may only include a LCD, or only a CCD with lens.

System of Wall Switch Devices

Figure 21:
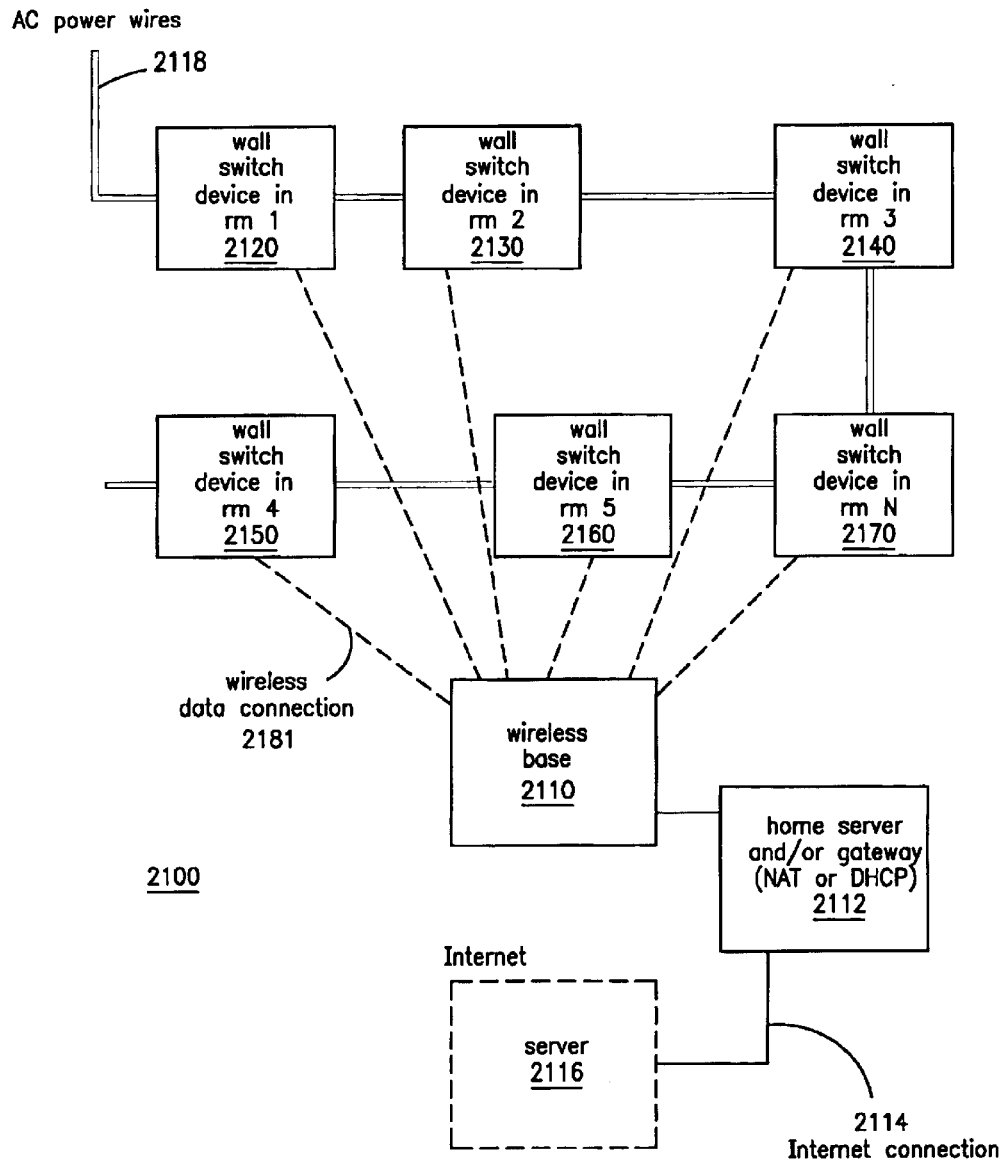
FIG. 21 illustrates a functional block diagram of one embodiment of a system of wall switch devices and a wireless transceiver base.

FIG. 21 illustrates a functional block diagram of one embodiment of a system 2100 of wall switch devices 2120, 2130, 2140, 2150, 2160, and 2170 and a wireless transceiver base 2110. In one embodiment, wall switch devices 2120, 2130, 2140, 2150, 2160, and 2170 are located in rooms around any building, such as a house, at the light switch location near the entry doorway to the room.

In one embodiment, the wall switch devices 2120, 2130, 2140, 2150, 2160, and 2170 are similar to that shown in FIG. 18 with an integrated LCD, softkeys, and CCD with lens. In an alternative embodiment, a device docking apparatus such as one illustrated in FIG. 1 may be used in the system described above.

A control charging module (not shown) in each wall switch device 2120, 2130, 2140, 2150, 2160, and 2170 is connected to the AC power wires 2118 that run to that respective junction box. In one embodiment, the control charging module for the embodiment shown in FIG. 21 may be in a device docking apparatus 100 as shown in FIG. 1 and only have the purpose of charging batteries in a portable electronic device docked in the device docking apparatus from the line power. As discussed above the power must be converted from AC to DC, with the correct current and voltage supplied.

FIG. 21 shows that there is communication between each wall switch device, via a wireless data transfer protocol, and communication to either a local home server 2112, and/or via a gateway 2112 to a server located external to the home anywhere on the Internet 2116 via an Internet connection 2114. Each wall switch device also includes a wireless local area network (LAN) transceiver functionally connected to the control charging module. The Internet connection 2114 may be dial-up, cable, or DSL. Regardless of where the actual data destination is away from the wall switch devices 2120, 2130, 2140, 2150, 2160, and 2170, the data is transferred first to the wireless transceiver base 2110 in the vicinity of the wall switch devices 2120, 2130, 2140, 2150, 2160, and 2170.

The wireless transceiver base 2110 communicates to each wall switch device 2120, 2130, 2140, 2150, 2160, and 2170 via a wireless data transfer protocol In one embodiment, the wireless data transfer protocol that is used for local area communications is a system based on the IEEE 802.11b wireless communication standard. A wireless hub system such as an 802.11b system has a range of approximately 150 feet so it would be able to reach wall switch devices in a typical house. This architecture allows access to information the home server and/or the Internet via each wall switch device. In an alternative embodiment, the wireless transfer protocol may be Bluetooth™. Wireless LAN systems such as IEEE 802.11b are able to function in ad-hoc mode, where there is no central hub. Each switch device is a node on the network and can communicate with any other switch device within range of the radio-frequency field. Therefore, switch devices may be added at greater distances as long as each device is in communication contact with at least one other wireless LAN device.

In an alternative embodiment, there may also be communication between each portable electronic device docked or not docked in wall switch devices 2120, 2130, 2140, 2150, 2160, and 2170, via the wireless transceiver base 2110 in addition to communication to either the local home server 2112, and/or via a gateway 2112 to a server located external to the home anywhere on the Internet 2114. Regardless of where the actual data destination is away from the portable electronic devices, the data is transferred first to the wireless transceiver base in the vicinity of the portable electronic devices.

In one embodiment, the wireless system provides a discrete identifier or ID, for each of the wall switch devices 2120, 2130, 2140, 2150, 2160, and 2170. With this system, the source of the information that is entered or modified on a wall switch device 2120, 2130, 2140, 2150, 2160, and 2170 may be tracked by other wall switch device 2120,2130, 2140, 2150, 2160, and 2170 or by the home server 2112. An organizing software application is used to associate a user defined name to each wall switch device, in addition to the discrete class C network IP address such as a 192.168.1.X address specified for use in dynamic host configuration protocol (DHCP) systems. For example, one switch device has a class CIP address but is also referred to as "master bedroom" switch device.

FIG. 21 is an illustration of a system including wall switch devices. However, in alternative embodiments of systems discussed above with reference to FIG. 21, power outlet devices or device docking apparatus that fasten to power outlet modules may be used instead of wall switch devices and device docking apparatus that fasten to wall switch modules.

Figure 22:
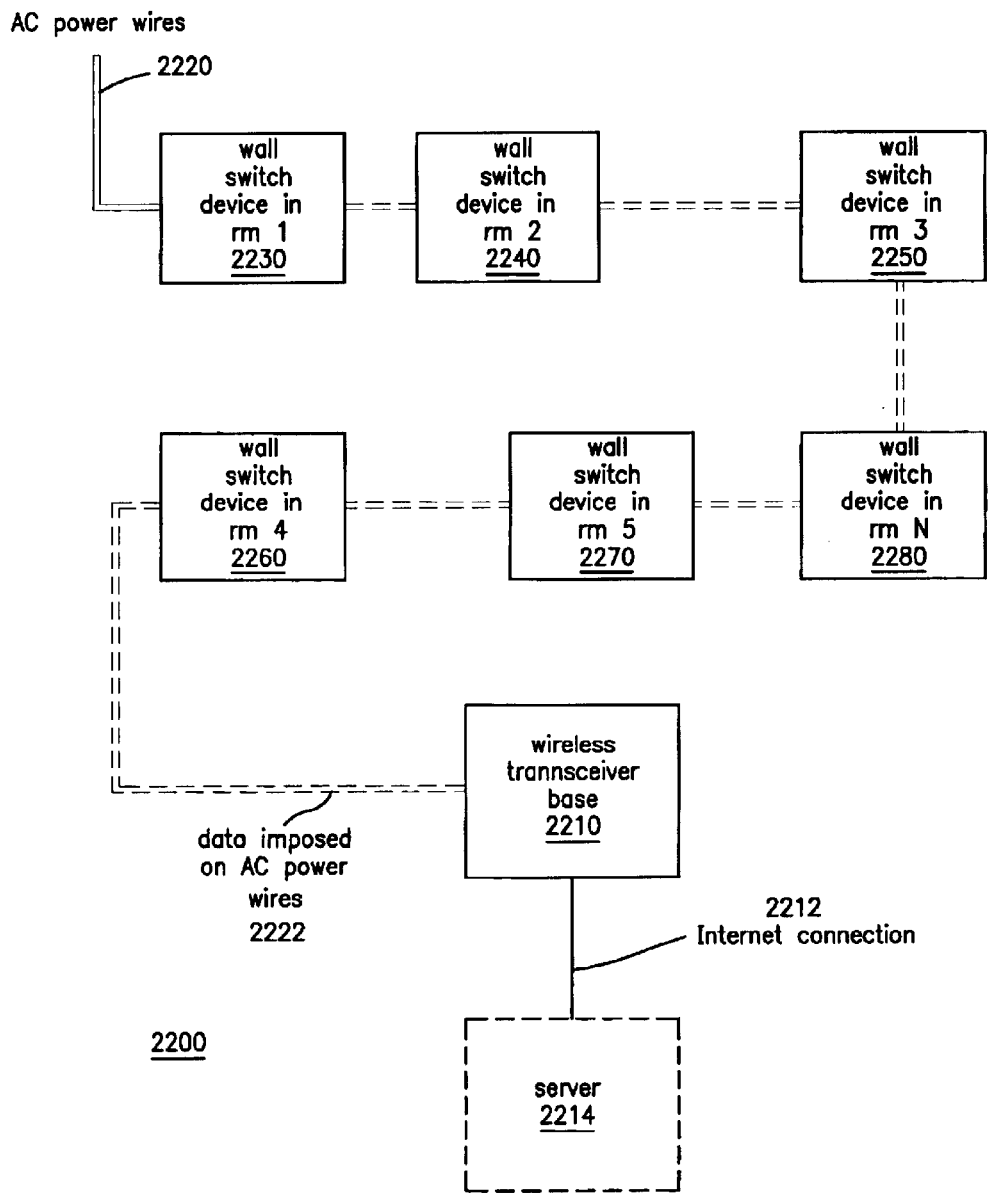
FIG. 22 a functional block diagram of one embodiment of a system of wall switch devices communicating via data signals that are superimposed on AC power wires.

FIG. 22 a functional block diagram of one embodiment of a system of wall switch devices 2230, 2240, 2250, 2260, 2270, and 2280 communicating via data signals 2222 that are superimposed on AC power wires 2220. Intellon, Inc. is a provider of integrated circuits for sending and receiving data over AC power lines. The system 2200 shown in FIG. 22 shows the information transfer between the wall switch devices 2230, 2240, 2250, 2260, 2270, and 2280. As in the system 2000 shown in FIG. 20, there are wall switch devices 2230, 2240, 2250, 2260, 2270, and 2280 located at various points around a building, such as a house. Each wall switch device 2230, 2240, 2250, 2260, 2270, and 2280 is connected to the power system wiring 2220 at each junction box. However, in the system shown in FIG. 22, the control charging module of each wall switch device 2230, 2240, 2250, 2260, 2270, and 2280 must also include a LAN data transceiver (not shown) because the transfer of data between the wall switch devices 2230, 2240, 2250, 2260, 2270, and 2280 uses the power wiring 2220 as the medium, with data signals 2222 superimposed on the AC fluctuation but at a much higher frequency.

The data transceiver filters out the low frequency AC voltage, de-modulates and otherwise digitally processes the data signal, and transfers the information superimposed on the AC wiring to the wall switch devices 2230, 2240, 2250, 2260, 2270, and 2280. It also isolates the wall switch device electrical system from the high voltage home wiring system In one embodiment, there may also be a wireless transceiver base 2210 to allow communication between each wall switch device 2230, 2240, 2250, 2260, 2270, and 2280 and a local home server 2214, and/or a gateway to a server 2214 located external to the home anywhere on the Internet via an Internet connection 2212. The Internet connection 2212 may be dial-up, cable, or DSL. This type of communication requires a wireless data transfer protocol. Regardless of where the actual data destination is away from the wall switch devices 2230, 2240, 2250, 2260, 2270, and 2280, the data is transferred first to the wireless transceiver base 2210 in the vicinity of the wall switch devices 2230, 2240, 2250, 2260, 2270, and 2280.

The wireless transceiver base 2210 communicates with each wall switch device 2230, 2240, 2250, 2260, 2270, and 2280 via the wireless data transfer protocol. In one embodiment, the wireless data transfer protocol that is used for local area communications is a system based on the IEEE 802.11b wireless communication standard. A wireless hub system such as an 802.11b system has a range of approximately 150 feet so it would be able to reach wall switch devices in a typical house. This architecture allows access to information the home server 2214 and/or the Internet via each wall switch device 2230, 2240, 2250, 2260, 2270, and 2280. In an alternative embodiment, the wireless communication protocol may be Bluetooth™.

In an alternative embodiment, there may also be communication between each portable electronic device docked or not docked in wall switch devices 2230, 2240, 2250, 2260, 2270, and 2280. For this type of communication, the system 2200 of FIG. 2200 may use device docking apparatus as shown and described in FIG. 1. In one embodiment, the portable electronic devices may communicate by sending data packets 2222 using the AC power wires 2220 as the medium. Accordingly, the portable electronic devices must be docked in the device docking apparatus in order to communicate with other portable electronic devices also docked in various device docking apparatus. In an alternative embodiment, the portable electronic devices may communicate with one another and the local home server 2214 via the wireless transceiver base 2210 even without being docked in any device docking apparatus. In addition, the portable electronic devices may communicate with a server 2214 located external to the home anywhere on the Internet via a gateway. Regardless of where the actual data destination is away from the portable electronic devices, in the latter described embodiment, the data is transferred first to the wireless transceiver base 2210 in the vicinity of the portable electronic devices.

In one embodiment, the wireless system provides a discrete identifier or ID, for each of the wall switch devices 2230, 2240, 2250, 2260, 2270, and 2280. With this system, the source of the information that is entered or modified on a wall switch device 2230, 2240, 2250, 2260, 2270, and 2280 may be tracked by another wall switch device 2230, 2240, 2250, 2260, 2270, and 2280 or the server 2214.

FIG. 22 is an illustration of a system including wall switch devices. However, in alternative embodiments of systems discussed above with reference to FIG. 22, power outlet devices or device docking apparatus that fasten to power outlet modules may be used instead of wall switch devices and device docking apparatus that fasten to wall switch modules.

Figure 23:
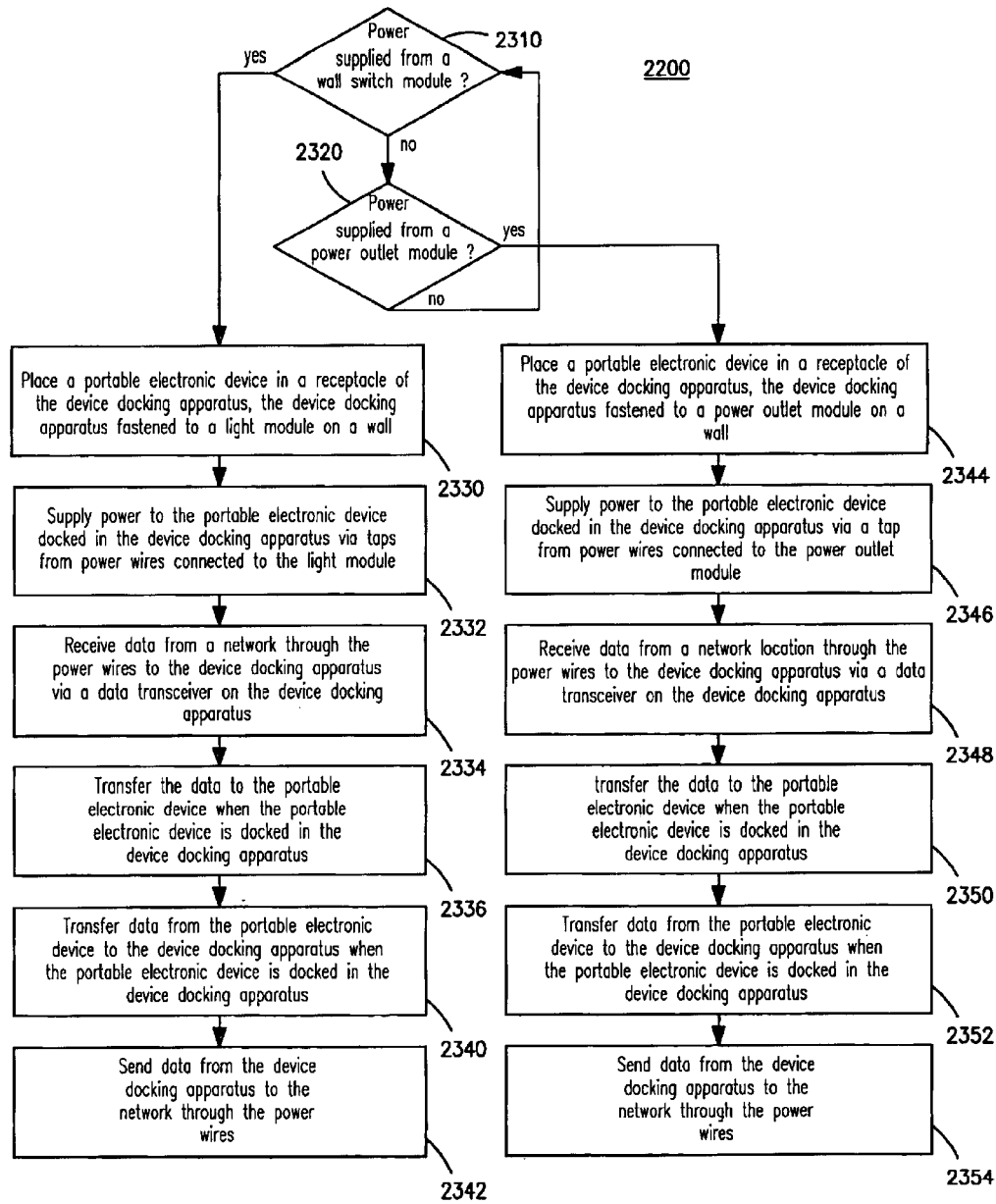
FIG. 23 illustrates a flow diagram of one embodiment of a process of using a device docking apparatus.

FIG. 23 illustrates a flow diagram of one embodiment of a process 2300 of using a device docking apparatus. At processing block 2310 it is determined if power is to be supplied from a wall switch module.

If yes, then the process moves to processing block 2330. At processing block 2330, a portable electronic device is placed in a receptacle of the device docking apparatus. The device docking apparatus is fastened to a light module on a wall.

At processing block 2332, power is supplied to the portable electronic device docked in the device docking apparatus via taps from power wires connected to the light switch module. At processing block 2334, data is received from a network through the power wires to the device docking apparatus via a data transceiver on the device docking apparatus. At processing block 2336, the data is transferred to the portable electronic device when the portable electronic device is docked in the device docking apparatus. At processing block 2340, data is transferred from the portable electronic device to the device docking apparatus when the portable electronic device is docked in the device docking apparatus. At processing block 2342, data is sent from the device docking apparatus to the network through the power wires.

Referring back to processing block 2310, if no, the process moves to processing block 2320 where it is determined if power is to be supplied from a power outlet module. If no, the process moves back to processing block 2310.

If yes, the process moves to processing block 2344. A portable electronic device is placed in a receptacle of the device docking apparatus. The device docking apparatus is fastened to a power outlet module. At processing block 2346, power is supplied to the portable electronic device docked in the device docking apparatus via a tap from power wires connected to the power outlet module. At processing block 2348, data is received from a network through the power wires to the device docking apparatus via a data transceiver on the device docking apparatus. At processing block 2350, the data is transferred to the portable electronic device when the portable electronic device is docked in the device docking apparatus. At processing block 2352, data is transferred from the portable electronic device to the device docking apparatus when the portable electronic device is docked in the device docking apparatus. At processing block 2354, data is sent from the device docking apparatus to the network through the power wires.

Figure 24:
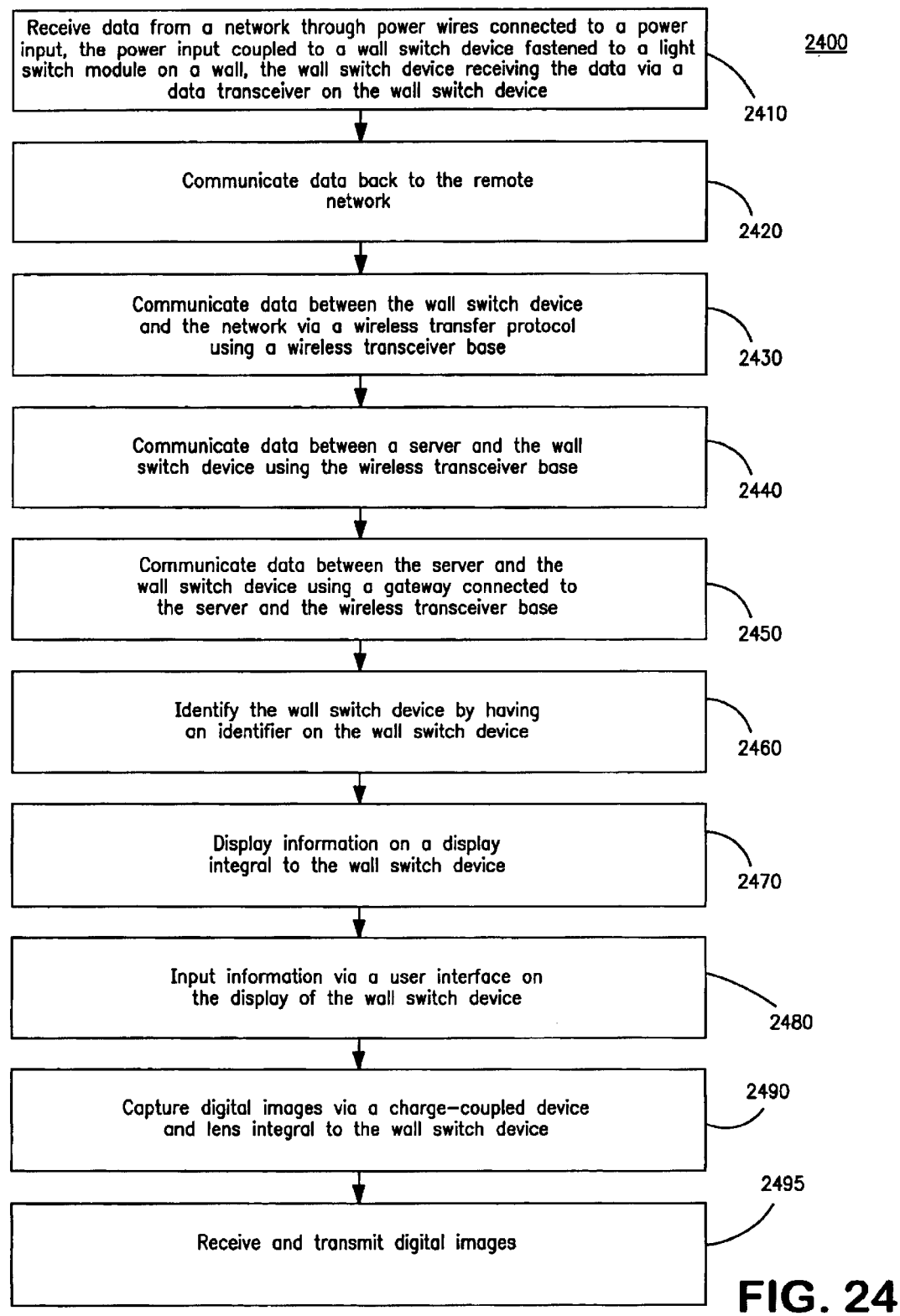
FIG. 24 illustrates a flow diagram of an alternative embodiment of a process of using a system including a wall switch device.

FIG. 24 illustrates a flow diagram of an alternative embodiment of a process 2400 of using a system including a wall switch device. At processing block 2410, data is received from a network through power wires connected to a power input. The power input is coupled to a wall switch device fastened to a light switch module on a wall. The wall switch device receives the data via a data transceiver on the wall switch device. At processing block 2420, the data is communicated back to the network. At processing block 2430, data is communicated between the wall switch device and the network via a wireless transfer protocol using a transceiver base. At processing block 2440, data is communicated between a server and the wall switch device using the wireless transceiver base. At processing block 2450, data is communicated between the server and the wall switch device using a gateway connected to the server and the wireless transceiver base.

At processing block 2460, the wall switch device is identified by having an identifier on the wall switch device. At processing block 2470, information is displayed on a display integral to the wall switch device. At processing block 2480, information is inputted via a user interface on the display module of the wall switch device. At processing block 2490, digital images are captured via a charge-coupled device and lens integral to the wall switch device. At processing block 2495, digital images are received and transmitted using the wireless transfer protocol.

FIG. 24 shows an embodiment of a process with wall switch devices. However, in an alternative embodiment, a similar process may use power outlet devices.

A device docking apparatus and a method for using the same have been described. Although the present invention is described herein with reference to specific embodiments, many modifications and variations therein will readily occur to those with ordinary skill in the art. Accordingly, all such variations and modifications are included within the intended scope of the present invention as defined by the following claims.

What is claimed is:

1. A device docking apparatus comprising:
   a wall switch plate to be fastened to a light switch module on a wall, the wall switch plate having a receptacle to hold a portable electronic device;
   a control charging module including electrical contacts to contact corresponding electrical contacts on the portable electronic device, the control charging module also including a printed circuit board and an integrated circuit; and
   an AC power input to supply power to the portable electronic device when the portable electronic device is docked in the device docking apparatus, wherein power from the AC power input is converted to DC power by the control charging module so that the power may be used to charge the portable electronic device when the portable electronic device is docked in the device docking apparatus.

2. The device docking apparatus of claim 1 further comprising a data transceiver on the device docking apparatus to allow the device docking apparatus to send and receive data via power lines coupled to the AC power input.

3. The device docking apparatus of claim 2 wherein the data is sent and received from a network.

4. The device docking apparatus of claim 3 wherein the network is Internet.

5. The device docking apparatus of claim 1 wherein the data is sent and received from a second device docking apparatus.

6. The device docking apparatus of claim 1 wherein the portable electronic device is capable of sending and receiving data from the device docking apparatus when the portable electronic device is docked in the device docking apparatus.

7. The device docking apparatus of claim 1 further comprising a wireless transceiver base on the device docking apparatus to allow the device docking apparatus to send and receive data via a wireless transfer protocol.

8. The device docking apparatus of claim 7 wherein the data is sent and received from a network.

9. The device docking apparatus of claim 8 wherein the network is Internet.

10. The device docking apparatus of claim 7 wherein the data is sent and received from a second device docking apparatus.

11. The device docking apparatus of claim 7 wherein the portable electronic device and device docking apparatus are capable of sending and receiving data between each other via the wireless transceiver base.

12. The device docking apparatus of claim 7 wherein the wireless transfer protocol is IEEE 802.11b.

13. The device docking apparatus of claim 1 further comprising a wireless transceiver base located separately from the device docking apparatus to send and receive data via a wireless transfer protocol.

14. The device docking apparatus of claim 1 wherein the receptacle on the wall switch plate is a dock.

15. The device docking apparatus of claim 1 wherein the AC power input supplies 120 V power to the portable electronic device.

16. The device docking apparatus of claim 1 wherein the portable electronic device is a personal digital assistant (PDA).

17. The device docking apparatus of claim 1 wherein the portable electronic device is a display module.

18. The device docking apparatus of claim 17 wherein the display module includes a plurality of buttons and a user interface.

19. The device docking apparatus of claim 1 wherein the portable electronic device is a cellular phone.

20. A device docking apparatus comprising:
   a power outlet plate to be fastened to a power outlet module on a wall, the power outlet plate having a receptacle to hold a portable electronic device;
   a control charging module including electrical contacts to contact corresponding electrical contacts on the portable electronic device, the control charging module also including a printed circuit board and an integrated circuit; and
   an AC power input to supply power to the portable electronic device when the portable electronic device is docked in the device docking apparatus, wherein power from the power input is converted by the control charging module so that the power may be used to charge the portable electronic device when the portable electronic device is docked in the device docking apparatus.

21. The device docking apparatus of claim 20 further comprising a data transceiver on the device docking apparatus to allow the device docking apparatus to send and receive data via power wires coupled to the AC power input.

22. The device docking apparatus of claim 21 wherein the data is sent and received from a network.

23. The device docking apparatus of claim 22 wherein the network is Internet.

24. The device docking apparatus of claim 21 wherein the data is sent and received from a second device docking apparatus.

25. The device docking apparatus of claim 21 wherein the portable electronic device is capable of sending and receiving data from the device docking apparatus when the portable electronic device is docked in the device docking apparatus.

26. The device docking apparatus of claim 20 further comprising a wireless transceiver base on the device docking apparatus to allow the device docking apparatus to send and receive data via a wireless transfer protocol.

27. The device docking apparatus of claim 26 wherein the data is sent and received from a network.

28. The device docking apparatus of claim 27 wherein the network is Internet.

29. The device docking apparatus of claim 26 wherein the data is sent and received from a second device docking apparatus.

30. The device docking apparatus of claim 26 wherein the portable electronic device and device docking apparatus are capable of sending and receiving data between each other via the wireless transceiver base.

31. The device docking apparatus of claim 26 wherein the wireless transfer protocol is IEEE 802.11b.

32. The device docking apparatus of claim 20 further comprising a wireless transceiver base located separately from the device docking apparatus to send and receive data via a wireless transfer protocol.

33. The device docking apparatus of claim 20 wherein the receptacle on the power outlet plate is a dock.

34. The device docking apparatus of claim 20 wherein the AC power input supplies 120 V power to the portable electronic device.

35. The device docking apparatus of claim 20 wherein the portable electronic device is a personal digital assistant (PDA).

36. The device docking apparatus of claim 20 wherein the portable electronic device is a display module.

37. The device docking apparatus of claim 36 wherein the display module includes a plurality of buttons and a user interface.

38. The device docking apparatus of claim 20 wherein the portable electronic device is a cellular phone.

39. A method of using a device docking apparatus comprising:
placing a portable electronic device in a receptacle of the device docking apparatus, the device docking apparatus fastened to a module on a wall;
supplying power to the portable electronic device docked in the device docking apparatus from power wires connected to the module;
receiving data from a network through the power wires to the device docking apparatus via a data transceiver on the device docking apparatus; and
transferring the data to the portable electronic device when the portable electronic device is docked in the device docking apparatus.

40. The method of claim 39 further comprising:
transferring data from the portable electronic device to the device docking apparatus when the portable electronic device is docked in the device docking apparatus; and
sending data from the device docking apparatus to the network through the power wires.

41. The method of claim 39 wherein the network is a remote network.

42. The method of claim 41 wherein the remote network is Internet.

43. The method of claim 39 wherein the network includes another device docking apparatus.

44. The method of claim 39 further comprising inputting information to the device docking apparatus using a user interface on the device docking apparatus.

45. The method of claim 39 wherein the module on the wall is a light switch module.

46. The method of claim 39 wherein the module on the wall is a power outlet module.

47. A method of using a device docking apparatus comprising:
placing a portable electronic device in a receptacle of the device docking apparatus, the device docking apparatus fastened to a module on a wall;
supplying power to the portable electronic device docked in the device docking apparatus from power wires connected to the module;
receiving data from a network to the device docking apparatus using the power wires via a data transceiver on the device docking apparatus and using a wireless transfer protocol via a wireless transceiver base coupled with the device docking apparatus; and
transferring the data to the portable electronic device.

48. The method of claim 47 further comprising:
transferring data from the portable electronic device to the device docking apparatus; and
sending data from the device docking apparatus to the network through the wireless transceiver base.

49. The method of claim 47 wherein the network is a remote network.

50. The method of claim 49 wherein the remote network is Internet.

51. The method of claim 47 wherein the network includes another device docking apparatus.

52. The method of claim 47 further comprising inputting information to the device docking apparatus using a user interface on the device docking apparatus.

53. The method of claim 47 wherein the module on the wall is a light switch module.

54. The method of claim 47 wherein the module on the wall is a power outlet module.

* * * * *